(12) United States Patent  
Naito et al.

(10) Patent No.: US 10,689,112 B2  
(45) Date of Patent: Jun. 23, 2020

(54) UNMANNED FLYING OBJECT, CONTROL METHOD, AND NON-TRANSITORY RECORDING MEDIUM STORING PROGRAM THAT SWITCH FLIGHT STATE UPON CAPTURING AN OBJECT IN THE AIR

(71) Applicant: Panasonic Intellectual Property Corporation of America, Torrance, CA (US)

(72) Inventors: Eiichi Naito, Kyoto (JP); Takenobu Aoshima, Osaka (JP); Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 401 days.

(21) Appl. No.: 15/607,984

(22) Filed: May 30, 2017

(65) Prior Publication Data

US 2017/0355461 A1    Dec. 14, 2017

Related U.S. Application Data

(60) Provisional application No. 62/347,232, filed on Jun. 8, 2016.

(30) Foreign Application Priority Data

Jan. 30, 2017    (JP) ................................. 2017-014087

(51) Int. Cl.
*B64C 39/02*    (2006.01)
*B64D 1/12*    (2006.01)
(Continued)

(52) U.S. Cl.
CPC ................ *B64D 1/12* (2013.01); *B64C 13/18* (2013.01); *B64C 39/024* (2013.01); *B64D 47/06* (2013.01);
(Continued)

(58) Field of Classification Search
CPC .......... B64C 2201/128; B64C 2201/12; B64C 2201/141; B64D 1/00; B64D 47/00
See application file for complete search history.

(56) References Cited

U.S. PATENT DOCUMENTS 9,085,362 B1 *   7/2015   Kilian ........................ B64F 1/02
9,701,408 B1 *   7/2017   Willison ................ B64C 39/024
(Continued)

*Primary Examiner* — Valentina Xavier
(74) *Attorney, Agent, or Firm* — Greenblum & Bernstein, P.L.C.

(57) ABSTRACT

An unmanned flying object that flies in the air includes a capturer, including at least one of a net, a sucking device, a stick, a rope or a spear, that captures an object other than the unmanned flying object in the air, a sensor that detects that the capturer has captured the object, and a processor that performs operations including: receiving an operation signal via wireless communication; performing a manual flight control that controls the unmanned flying object on the basis of the operation signal; switching from the manual flight control to an autonomous flight control that controls the unmanned flying object to not be dependent on the operation signal received via the wireless communication, when the sensor detects the capture of the object while the manual flight control is being performed.

17 Claims, 26 Drawing Sheets

(51) Int. Cl.
*B64C 13/18* (2006.01)
*B64D 47/06* (2006.01)
*G05D 1/00* (2006.01)

(52) U.S. Cl.
CPC ...... *G05D 1/0094* (2013.01); *B64C 2201/024* (2013.01); *B64C 2201/108* (2013.01); *B64C 2201/12* (2013.01); *B64C 2201/141* (2013.01); *B64C 2201/146* (2013.01)

(56) References Cited

U.S. PATENT DOCUMENTS

| | | | |
|---|---|---|---|
| 10,023,323 B1* | 7/2018 | Roberts | B64D 43/00 |
| 2011/0220426 A1* | 9/2011 | Bond | A01K 77/00 |
| | | | 177/245 |
| 2015/0160658 A1* | 6/2015 | Reedman | G05D 1/102 |
| | | | 701/3 |
| 2016/0284221 A1* | 9/2016 | Hinkle | G08G 5/0034 |
| 2016/0376029 A1* | 12/2016 | Sekiya | F41H 11/02 |
| | | | 244/110 F |
| 2016/0376031 A1* | 12/2016 | Michalski | B64C 39/024 |
| | | | 701/15 |
| 2017/0144756 A1* | 5/2017 | Rastgaar Aagaah | |
| | | | B64C 39/024 |
| 2017/0253348 A1* | 9/2017 | Ashdown | B64F 1/02 |
| 2018/0109767 A1* | 4/2018 | Li | H04N 5/23206 |
| 2018/0253091 A1* | 9/2018 | Pfoertzsch | B64C 39/024 |

* cited by examiner

UNMANNED FLYING OBJECT, CONTROL METHOD, AND NON-TRANSITORY RECORDING MEDIUM STORING PROGRAM THAT SWITCH FLIGHT STATE UPON CAPTURING AN OBJECT IN THE AIR

BACKGROUND

1. Technical Field

The present disclosure relates to an unmanned flying object that flies in the air, a method of controlling the unmanned flying object, and a non-transitory recording medium storing a program.

2. Description of the Related Art

To avoid a crime such as terrorism or an unexpected accident, a measure for a suspicious unmanned flying object (drone) has been requested. For example, the Metropolitan Police Department in Japan has introduced a manually operated capture unmanned flying object (intercept drone) including a net for capturing a suspicious drone, on Dec. 10, 2015.

Also, Japanese Patent No. 4222510 discloses a carrying method by an unmanned flying object. To be specific, there is disclosed an unmanned flying object for carrying articles, such as goods and documents, quickly with safety, including an automatic operation unit that enables automatic flight of the unmanned flying object, an autonomous flight controller that stabilizes automatic operation, a positioning unit that acquires position information and altitude information of the unmanned flying object by a global positioning system, a storage that stores position information of a destination, a flight controller that controls flight of the unmanned flying object on the basis of the position information of the destination input into the storage and the position information of the unmanned flying object acquired by the positioning unit, and a carrying articles housing part that houses the carrying articles. The carrying articles are housed in the carrying articles housing part, and the carrying articles are carried by the flight of the unmanned flying object on the basis of the position information of the destination input into the storage in advance.

SUMMARY

However, the above-described carrying method by the unmanned flying object is aimed at normal carrying articles, such as goods and documents, and does not consider about a case where other object in the air, such as a suspicious unmanned flying object, is captured. A further improvement is required for the method of controlling the unmanned flying object in the case where other object in the air, such as a suspicious unmanned flying object, is captured.

One non-limiting and exemplary embodiment provides an unmanned flying object that can properly fly even if the unmanned flying object captures other object in the air, such as a suspicious unmanned flying object, and also provides a control method and a non-transitory recording medium storing a program.

In one general aspect, the techniques disclosed here feature an unmanned flying object that flies in air including a capturer that captures other object in the air, a detector that detects that the capturer has captured the object, and an autonomous flight controller that controls a flight state of the unmanned flying object to be an autonomous flight state not dependent on an operation signal from outside if the detector detects the capture of the object.

With the present disclosure, the unmanned flying object that can properly fly even if the unmanned flying object captures other object in the air, such as a suspicious unmanned flying object, can be provided.

It should be noted that general or specific embodiments may be implemented as a system, a method, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
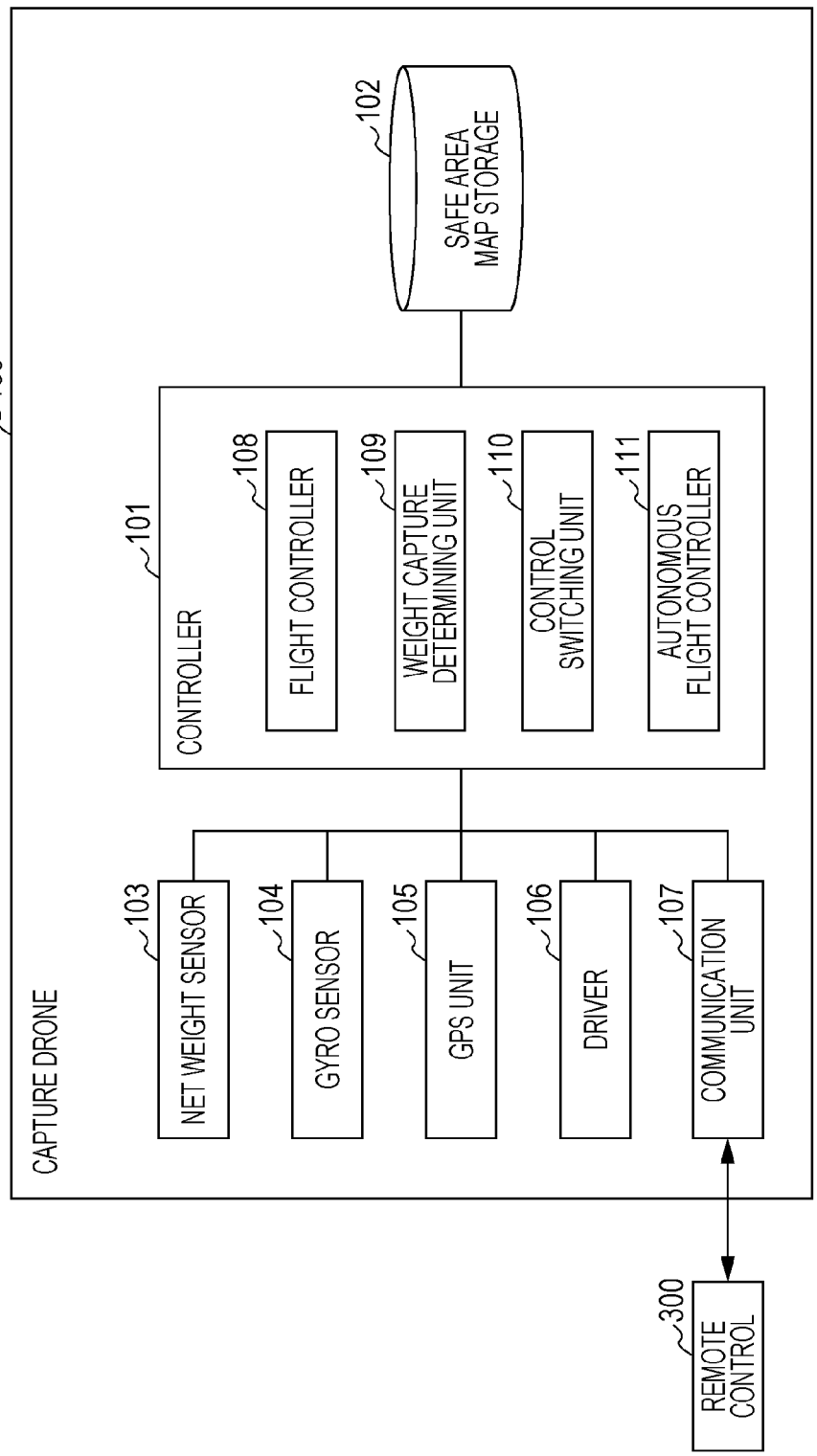
FIG. 1 is a block diagram showing an exemplary configuration of a capture drone according to a first embodiment of the present disclosure.

Underlying Knowledge Forming Basis of the Present Disclosure

As described above, to avoid a crime such as terrorism or an unexpected accident, a manually operated capture an unmanned flying object including a net for capturing a suspicious unmanned flying object has been introduced as a measure for a suspicious unmanned flying object. After the capture unmanned flying object captures the suspicious unmanned flying object, the capture unmanned flying object has to move the suspicious unmanned flying object to a safe area, such as a square or a river, as soon as possible because the suspicious unmanned flying object may be at risk for explosion or chemical distribution.

However, the operator of the capture unmanned flying object may not have knowledge about the safe area near the position at which the capture unmanned flying object has captured the suspicious unmanned flying object. Also, when the operator captures the suspicious unmanned flying object by using the capture unmanned flying object, the manual operation by the operator may become difficult due to a sudden change in weight. At the worst, an operation accident such as an accidental fall of the capture unmanned flying object may occur.

To address the above-described problem, in the present disclosure, for example, an operator manually operates a capture unmanned flying object until a capture of a suspicious unmanned flying object, and if the capture unmanned flying object detects a capture of a suspicious unmanned flying object, the flight state of the capture unmanned flying object is immediately switched to autonomous flight. In this autonomous flight, the capture unmanned flying object is controlled to move from the position at which the capture unmanned flying object has captured the suspicious unmanned flying object to the nearest safe area in the map held in the capture unmanned flying object.

In this case, the capture unmanned flying object can move to the safe area the most fast by the autonomous flight after the capture unmanned flying object captures the suspicious unmanned flying object. Also, an operation accident by manual operation due to a sudden change in weight of the capture unmanned flying object after the capture unmanned flying object captures the suspicious unmanned flying object can be avoided.

Based on the above-described underlying knowledge, the inventors have studied the way of control when a capture unmanned flying object captures other object in the air, such as a suspicious unmanned flying object, and as the result of the study, the inventors have completed the present disclosure.

In one general aspect, the techniques disclosed here feature an unmanned flying object that flies in air including a capturer that captures other object in the air, a detector that detects that the capturer has captured the object, and an autonomous flight controller that controls a flight state of the unmanned flying object to be an autonomous flight state not dependent on an operation signal from outside if the detector detects the capture of the object.

With this configuration, since the flight state of the unmanned flying object is controlled to be the autonomous flight state not dependent on the operation signal from the outside if the detector detects the capture of other object in air, the unmanned flying object that can properly fly even through the unmanned flying object captures the other object in the air such as a suspicious unmanned flying object can be provided.

The unmanned flying object may further include a communicator that receives the operation signal from the outside; a manual flight controller that controls the flight state of the unmanned flying object on the basis of the operation signal; and a control switcher that switches the flight state from manual flight by the manual flight controller to autonomous flight by the autonomous flight controller if the detector detects the capture of the object.

With this configuration, since the operation signal from the outside is received and the flight state of the unmanned flying object is controlled on the basis of the operation signal, the other object in the air such as the suspicious unmanned flying object can be captured by manual operation. Also, since the flight state is switched from the manual flight by the manual operation to the autonomous flight if the capture of the object is detected, an accident by the manual operation due to a sudden change in weight of the unmanned flying object after the unmanned flying object captures the other object such as the suspicious unmanned flying object in the air can be avoided.

The unmanned flying object may further include a weight measurer that measures a weight of the capturer. The detector may detect the capture of the object by determining that the weight measured by the weight measurer is a predetermined value or larger.

With this configuration, since the weight of the capturer is measured and the capture of the object is detected by determining that the measured weight is the predetermined value or larger, the capture of the object such as the suspicious unmanned flying object can be detected with high accuracy.

The unmanned flying object may further include a driver that causes the unmanned flying object to fly; and a current measurer that measures a driving current of the driver. The detector may detect the capture of the object by determining that the driving current measured by the current measurer is a predetermined value or larger.

With this configuration, since the driving current of the driver that causes the unmanned flying object to fly is measured and the capture of the object is detected by determining that the measured driving current is the predetermined value or larger, the capture of the object such as the suspicious unmanned flying object can be detected with high accuracy.

The unmanned flying object may further include a driver that causes the unmanned flying object to fly; and a rotation speed measurer that measures a rotation speed of the driver. The detector may detect the capture of the object by determining that the rotation speed measured by the rotation speed measurer is a predetermined value or larger.

With this configuration, since the rotation speed of the driver that causes the unmanned flying object to fly is measured and the capture of the object is detected by determining that the measured rotation speed is the predetermined value or larger, the capture of the object such as the suspicious unmanned flying object can be detected with high accuracy.

The unmanned flying object may further include a wind speed measurer that measures a wind speed relative to the unmanned flying object. The detector may change the predetermined value in accordance with the wind speed measured by the wind speed measurer.

With this configuration, since the wind speed relative to the unmanned flying object is measured and the predetermined value that is used for detecting the capture of the object is changed in accordance with the measured wind speed, the capture of the object such as the suspicious unmanned flying object can be detected with high accuracy also with regard to the wind speed.

The unmanned flying object may further include a storage that stores safe area position information indicating a position of a safe area being safe even if the object is landed on ground or water in the area. The autonomous flight controller may control the flight state of the unmanned flying object to cause the unmanned flying object to perform the autonomous flight from a point at which the detector has detected the capture of the object to the safe area indicated by the safe area position information stored in the storage.

With this configuration, since the safe area position information indicating the position of the safe area being safe even if the object is landed on the ground or the water in the area is stored, and the flight state of the unmanned flying object is controlled to cause the unmanned flying object to perform the autonomous flight from the point at which the capture of the object has been detected to the safe area indicated by the safe area position information, the unmanned flying object can reliably move to a safer position by the autonomous flight after the unmanned flying object captures the other object such as the suspicious unmanned flying object.

The communicator may notify the outside about the safe area position information indicating the position of the safe area to which the unmanned flying object performs the autonomous flight.

With this configuration, the outside, for example, an operation tool of the unmanned flying object, that is, an operator can be notified about the safe area position information indicating the position of the safe area being the destination to which the unmanned flying object performs the autonomous flight, and hence the operator and so forth can be notified about the destination of the unmanned flying object.

The communicator may notify the outside that the detector has detected the capture of the object.

With this configuration, the outside, for example, the operation tool of the unmanned flying object, that is, the operator can be notified that the capture of the object has been detected, and hence the operator and so forth can be notified that the object such as the suspicious unmanned flying object has been captured.

The detector may detect a fall of the object by determining that the weight measured by the weight measurer is smaller than a predetermined value after the capture of the object is detected.

With this configuration, since the weight of the capturer is measured and the fall of the object is detected by determining that the measured weight is smaller than the predetermined value after the capture of the object is detected, the fall of the object such as the suspicious unmanned flying object can be detected with high accuracy.

The communicator may notify the outside that the detector has detected the fall of the object.

With this configuration, the outside, for example, the operation tool of the unmanned flying object, that is, the operator can be notified that the fall of the object has been detected, and hence the operator and so forth can be notified that the object such as the suspicious unmanned flying object has fallen.

The communicator may notify the outside about fall position information indicating a position at which the detector has detected the fall of the object.

With this configuration, the outside, for example, the operation tool of the unmanned flying object, that is, the operator can be notified about the fall position information indicating the position at which the fall of the object has been detected, and hence the operator and so forth can be notified about the fall position of the object such as the suspicious unmanned flying object.

The unmanned flying object may further include a map information storage that stores map information in which safe area position information indicating a position of a safe area being safe even if the object is landed on ground or water in the area is associated with safety level information indicating a safety level of the safe area; and a target point manager that, with reference to the map information storage, sets, as a final target point of the autonomous flight, the safe area with the safety level being the highest in a range nearer from a current position as an increase amount of the weight measured by the weight measurer is larger.

With this configuration, with reference to the map information storage that stores the map information in which the safe area position information indicating the position of the safe area being safe even if the object is landed on the ground or the water in the area is associated with the safety level information indicating the safety level of the safe area, the safe area with the safety level being the highest in the range nearer from the current position is set as the final target point of the autonomous flight as the increase amount of the measured weight is larger. Accordingly, the unmanned flying object can reliably move to the safe area by the autonomous flight in accordance with the weight of the object such as the suspicious unmanned flying object.

The unmanned flying object may further include a battery that supplies power to the unmanned flying object; a remaining quantity measurer that measures a remaining quantity of the battery; a map information storage that stores map information in which safe area position information indicating a position of a safe area being safe even if the object is landed on ground or water in the area is associated with safety level information indicating a safety level of the safe area; and a target point manager that, with reference to the map information storage, sets, as a final target point of the autonomous flight, the safe area with the safety level being the highest in a range nearer from a current position as the remaining quantity measured by the remaining quantity measurer is smaller.

With this configuration, the remaining quantity of the battery is measured, and with reference to the map information storage that stores the map information in which the safe area position information indicating the position of the safe area being safe even if the suspicious object is landed on the ground or the water in the area is associated with the safety level information indicating the safety level of the safe area, the safe area with the safety level being the highest in the range nearer from the current position is set as the final target point of the autonomous flight as the measured remaining quantity of the battery is smaller. Accordingly, the unmanned flying object can reliably move to the safe area by the autonomous flight in accordance with the remaining quantity of the battery.

Also, this disclosure may be provided as not only the unmanned flying object including the above-described featured configuration, but also, for example, a method of controlling the unmanned flying object that executes featured processing corresponding to the featured configuration of the unmanned flying object. Also, the featured processing included in the method of controlling the unmanned flying object may be provided as a non-transitory computer-readable recording medium storing a program that causes a computer including a processor and a memory to execute the featured processing. Therefore, advantageous effects similar to those of the above-described unmanned flying object can be attained according to other aspects described below.

In another general aspect, the techniques disclosed here feature a method of controlling an unmanned flying object that flies in air. The method includes detecting that a capturer that captures other object in the air has captured the object; and controlling a flight state of the unmanned flying object to be an autonomous flight state not dependent on an operation signal from outside if the capture of the object is detected.

In still another general aspect, the techniques disclosed here feature a non-transitory computer-readable recording medium storing a program that causes a computer to function as a controller of an unmanned flying object that flies in air. When the program is executed by the computer, the program causes the computer to execute a method. The method includes detecting that a capturer that captures other object in the air has captured the object; and controlling a flight state of the unmanned flying object to be an autonomous flight state not dependent on an operation signal from outside if the capture of the object is detected.

As a matter of course, the above-described computer program may be distributed through the non-transitory computer-readable recording medium such as a CD-ROM, or a communication network such as the Internet.

Embodiments of the present disclosure will be described below with reference to the drawings. The embodiments described below represent specific examples of this disclosure. The shapes, components, steps, the order of the steps, and so forth provided in the embodiments are merely examples, and do not intend to limit the present disclosure.

Also, components not described in independent claims indicating the most generic concepts among components described in the embodiments are described as optional components. In any of the embodiments, the contents of each of the other embodiments may be combined. Further, the present disclosure contains various modifications obtained by modifying any one of the embodiments of the present disclosure within the scope conceived by those skilled in the art.

First Embodiment

A capture drone being an example of an unmanned flying object according to this embodiment is described. FIG. 1 is a block diagram showing an exemplary configuration of a capture drone 100 according to a first embodiment of the present disclosure. The capture drone 100 shown in FIG. 1 is remotely operated by using a remote control (operation tool) 300. The capture drone 100 is an unmanned flying object capable of making autonomous flight. The capture drone 100 can make autonomous flight without receiving a remote instruction from the remote control 300.

The capture drone 100 includes a controller 101, a safe area map storage 102, a net weight sensor 103, a gyro sensor 104, a global positioning system (GPS) unit 105, a driver 106, and a communication unit 107. The controller 101 is formed of, for example, a processor, and includes a flight controller 108, a weight capture determining unit 109, a control switching unit 110, and an autonomous flight controller 111.

Figure 2:
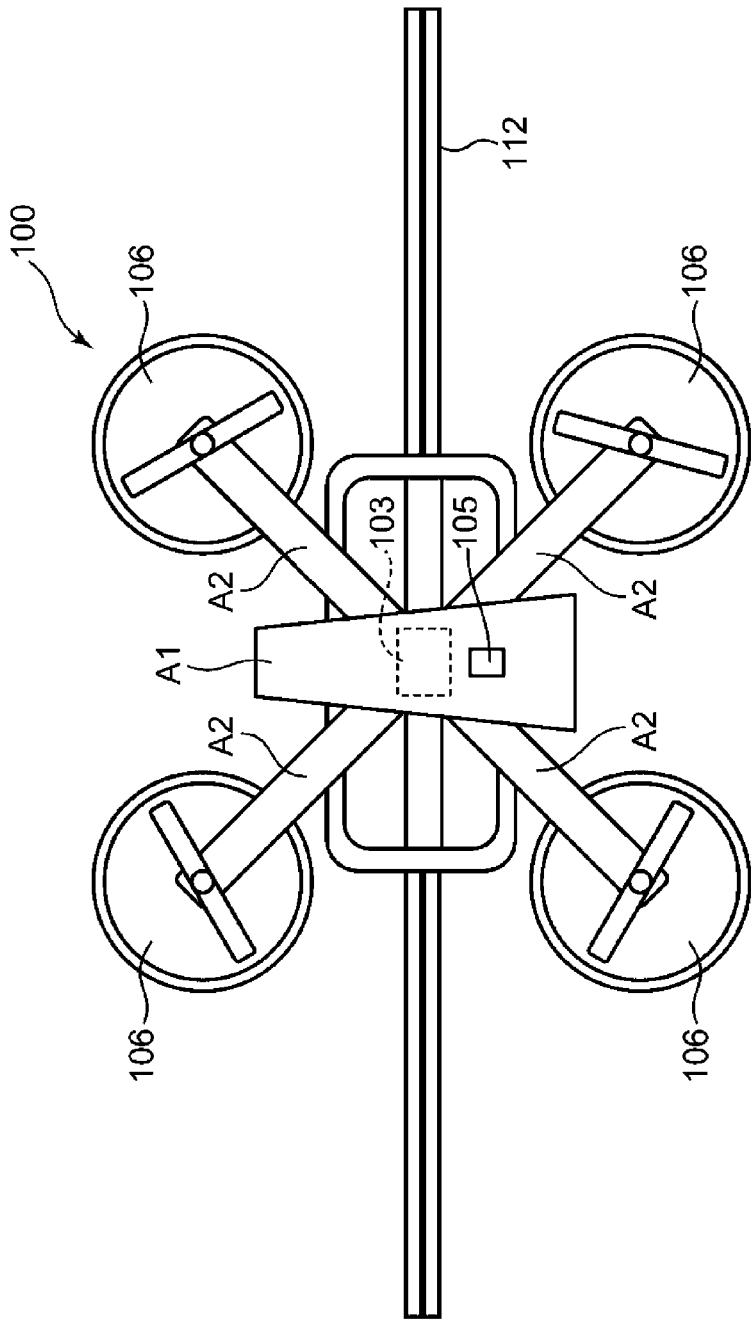
FIG. 2 is an external view from an upper surface of the capture drone shown in FIG. 1.
Figure 3:
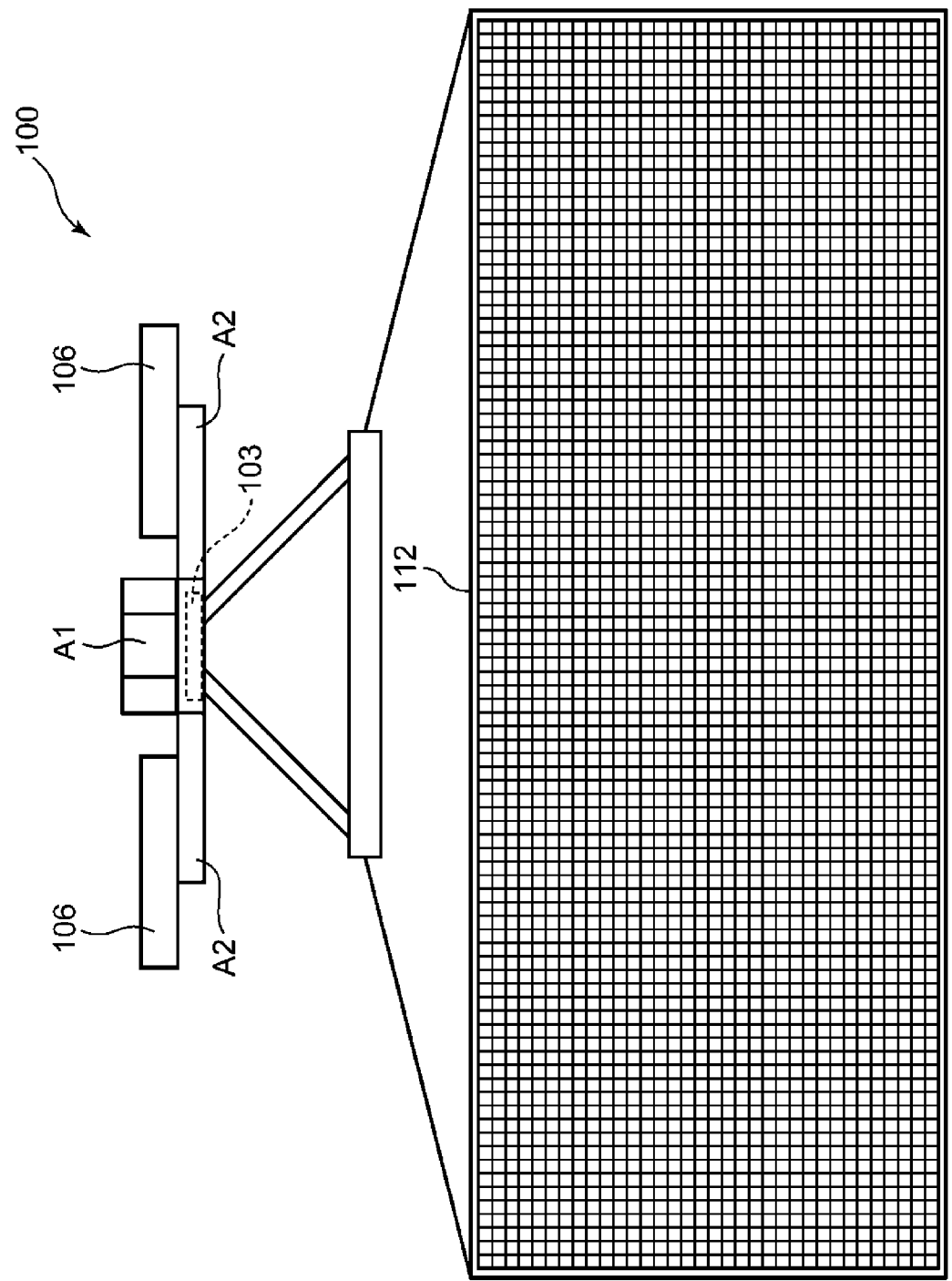
FIG. 3 is an external view from a front surface of the capture drone shown in FIG. 1.

FIG. 2 is an external view from an upper surface of the capture drone 100 shown in FIG. 1. FIG. 3 is an external view from a front surface of the capture drone 100 shown in FIG. 1. As shown in FIGS. 2 and 3, the capture drone 100 further includes a main body section A1, support sections A2, and a capture net 112.

The driver 106 is mounted at each of distal ends of the support sections A2 extending in four directions from the main body section A1, and generates a driving force of the capture drone 100. The GPS unit 105 is mounted at the upper side of the main body section A1. The net weight sensor 103 is mounted at the lower side of the main body section A1. The controller 101, the safe area map storage 102, the gyro sensor 104, and the communication unit 107 are provided in the main body section A1. The capture net 112 is formed of, for example, a net having a length of 3 m and a width of 2 m, and is mounted at the lower side of the main body section A1. While the capture drone 100 includes four drivers 106 in FIG. 2, the number of drivers 106 is not limited thereto. For example, five or more drivers 106 may be provided.

Figure 4:
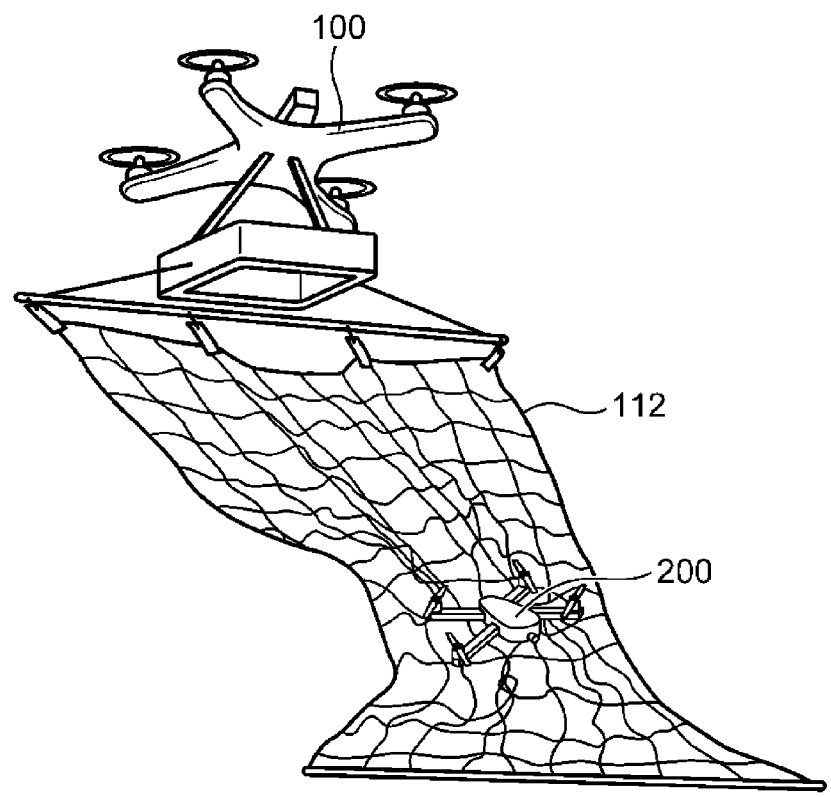
FIG. 4 is an illustration showing an exemplary state in which the capture drone shown in FIG. 1 is capturing a suspicious drone.

FIG. 4 is an illustration showing an exemplary state in which the capture drone 100 shown in FIG. 1 is capturing a suspicious drone 200. As shown in FIG. 4, the capture drone 100 captures the suspicious drone 200 with the capture net 112 by receiving an operation from the remote control 300 and moving the capture drone 100. The suspicious drone 200 gets tangled in the air and is captured in the capture net 112.

Another object in the air to be captured with the capture net 112 by the capture drone 100 is not limited to the suspicious drone 200, and may be any other object as long as the object is a flying object with a size that can be captured with the capture net 112. Also, a capturer that captures other object in the air is not limited to the above-described capture net. For example, any one of various capturers, such as a plurality of arms that hold other object in the air, a sucking device that sucks other object in the air, a sticking member that sticks other object in the air, a rope that tangles and catches other object in the air, or a spear like a whaling gun driven into other object in the air, may be used.

Referring back to FIG. 1, the controller 101 controls the net weight sensor 103, the gyro sensor 104, the GPS unit 105, the drivers 106, and the communication unit 107.

The communication unit 107 communicates with the remote control 300 by using a communication technology such as an Industry Science Medical (ISM) band with a band of 2.4 GHz, and hence transmits and receives information.

The gyro sensor 104 detects an angle and an angular speed of the capture drone 100, and outputs angle information and angular speed information to the controller 101. The GPS unit 105 detects a current position of the capture drone 100, and outputs current position information indicating the detected current position to the controller 101. The controller 101 controls the drivers 106 by using, for example, the detected angle information, angular speed information, and current position information.

The drivers 106 receive an instruction from the controller 101, and controls movement of the capture drone 100. To be specific, the drivers 106 each include a propeller (see FIG. 2) and a motor (not shown) that rotates the propeller. The controller 101 controls the moving direction and the flight state of the capture drone 100 by properly controlling the rotation speed of the propeller of the driver 106.

The flight controller 108 is an example of a manual flight controller that controls the flight state of the capture drone 100 on the basis of an operation signal. The flight controller 108 controls the drivers 106 in accordance with an operation signal received from the remote control 300 by the communication unit 107.

The net weight sensor 103 is a sensor that measures the weight of the capture net 112. When a suspicious drone 200 is captured with the capture net 112, the weight of the capture net 112 includes the weight of the suspicious drone 200. In this case, the net weight sensor 103 measures the weight of the capture net 112 including the weight of the suspicious drone 200.

The weight capture determining unit 109 determines whether the suspicious drone 200 has been captured or not on the basis of the weight measured by the net weight sensor 103. The weight capture determining unit 109 includes a low-pass filter that filters an output value indicating the weight measured by the net weight sensor 103. If the weight capture determining unit 109 determines that the suspicious drone 200 has been captured, the weight capture determining unit 109 notifies the control switching unit 110 about the determination result.

When the control switching unit 110 receives the input of the determination result, the control switching unit 110 does not receive an operation from the remote control 300, and switches the control of the flight from manual flight by the flight controller 108 to autonomous flight by the autonomous flight controller 111. That is, when the weight capture determining unit 109 detects the capture of the suspicious drone 200, the control switching unit 110 switches the control of the flight from the manual flight by the flight controller 108 to the autonomous flight by the autonomous flight controller 111.

If the control switching unit 110 switches the control of the flight to the autonomous flight, the autonomous flight controller 111 controls the drivers 106 by the autonomous flight (described later). Also, the autonomous flight controller 111 notifies the remote control 300 through the communication unit 107 that the suspicious drone 200 has been captured and the control of the flight of the capture drone 100 has been switched to the autonomous flight.

The safe area map storage 102 is formed of, for example, a memory. The safe area map storage 102 stores a safe area map in advance as map information in which safe area position information indicating the position of a safe area being safe even if the suspicious object is landed on the ground or water in the area is associated with safety level information indicating the safety level of the safe area (for example, information on safe area and quasi-safe area).

The autonomous flight controller 111 determines the nearest safe area from the safe area map storage 102 on the basis of the current position information of the capture drone 100 obtained from the GPS unit 105, and generates a flight route to the nearest safe area. The autonomous flight controller 111 controls the drivers 106 on the basis of the generated flight route, moves the suspicious drone 200 to the safe area being the nearest from the captured position, and allows the capture drone 100 to land on the ground or water, or allows the capture drone 100 to drop the suspicious drone 200 and to land the suspicious drone 200 on the ground or water.

Figure 5:
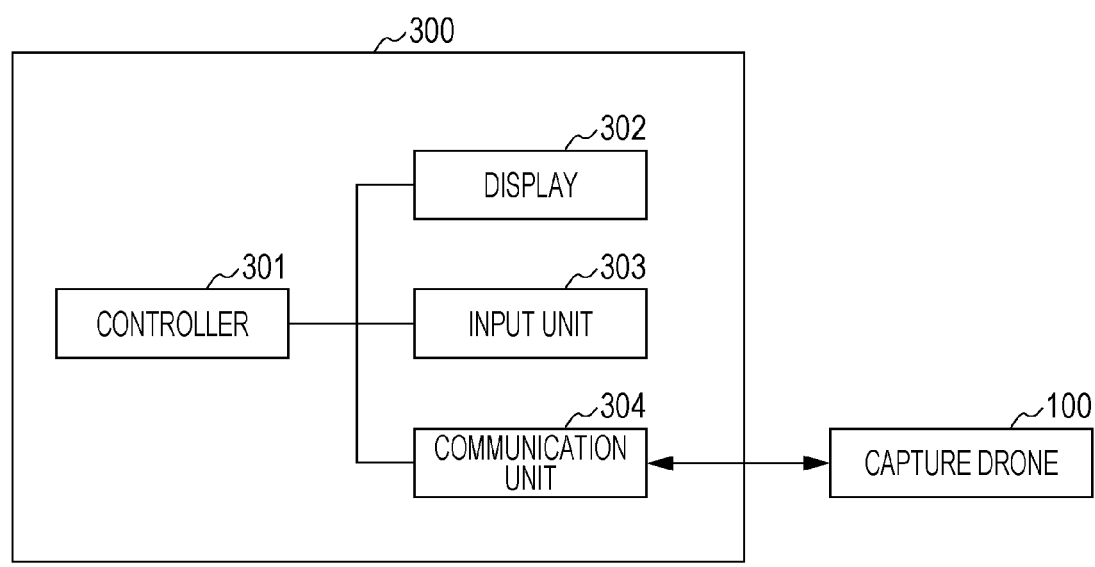
FIG. 5 is a block diagram showing an exemplary configuration of a remote control shown in FIG. 1.
Figure 6:
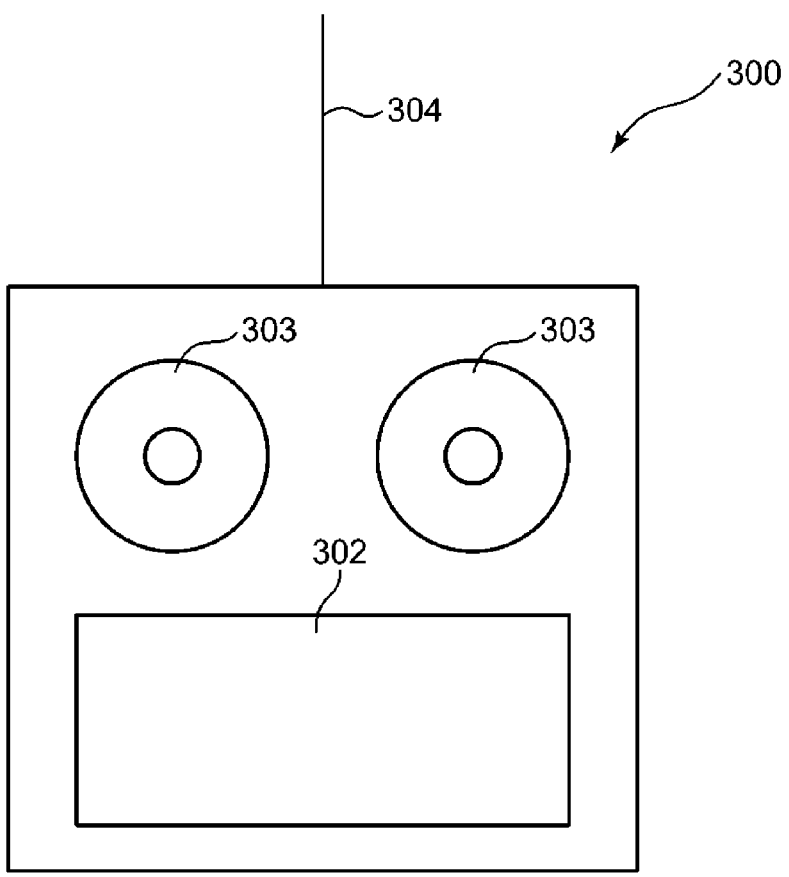
FIG. 6 is an external view from a front surface of the remote control shown in FIG. 5.

Next, the remote control 300 for operating the capture drone 100 shown in FIG. 1 is described. FIG. 5 is a block diagram showing an exemplary configuration of the remote control 300 shown in FIG. 1. FIG. 6 is an external view from a front surface of the remote control 300 shown in FIG. 5. As shown in FIGS. 5 and 6, the remote control 300 includes a controller 301, a display 302, an input unit 303, and a communication unit 304.

The controller 301 controls the display 302, the input unit 303, and the communication unit 304.

The display 302 displays various operation screens and notification screens. For example, the display 302 is used for making a notification to an operator by displaying a notification screen that makes a notification that the capture drone 100 has captured the suspicious drone 200, and a communication screen that makes a notification that the capture drone 100 starts the autonomous flight and does not receive an instruction from the remote control 300.

The input unit 303 receives an input instruction from the operator of the capture drone 100. For example, the input unit 303 is formed of two sticks shown in FIG. 6. Each stick is movable up, down, left, and right.

The communication unit 304 communicates with the capture drone 100 by using a communication technology, such as the ISM band with the band of 2.4 GHz, transmits instruction information such as an operation instruction of the operator from the input unit 303, and receives various notification information from the capture drone 100.

Figure 7:
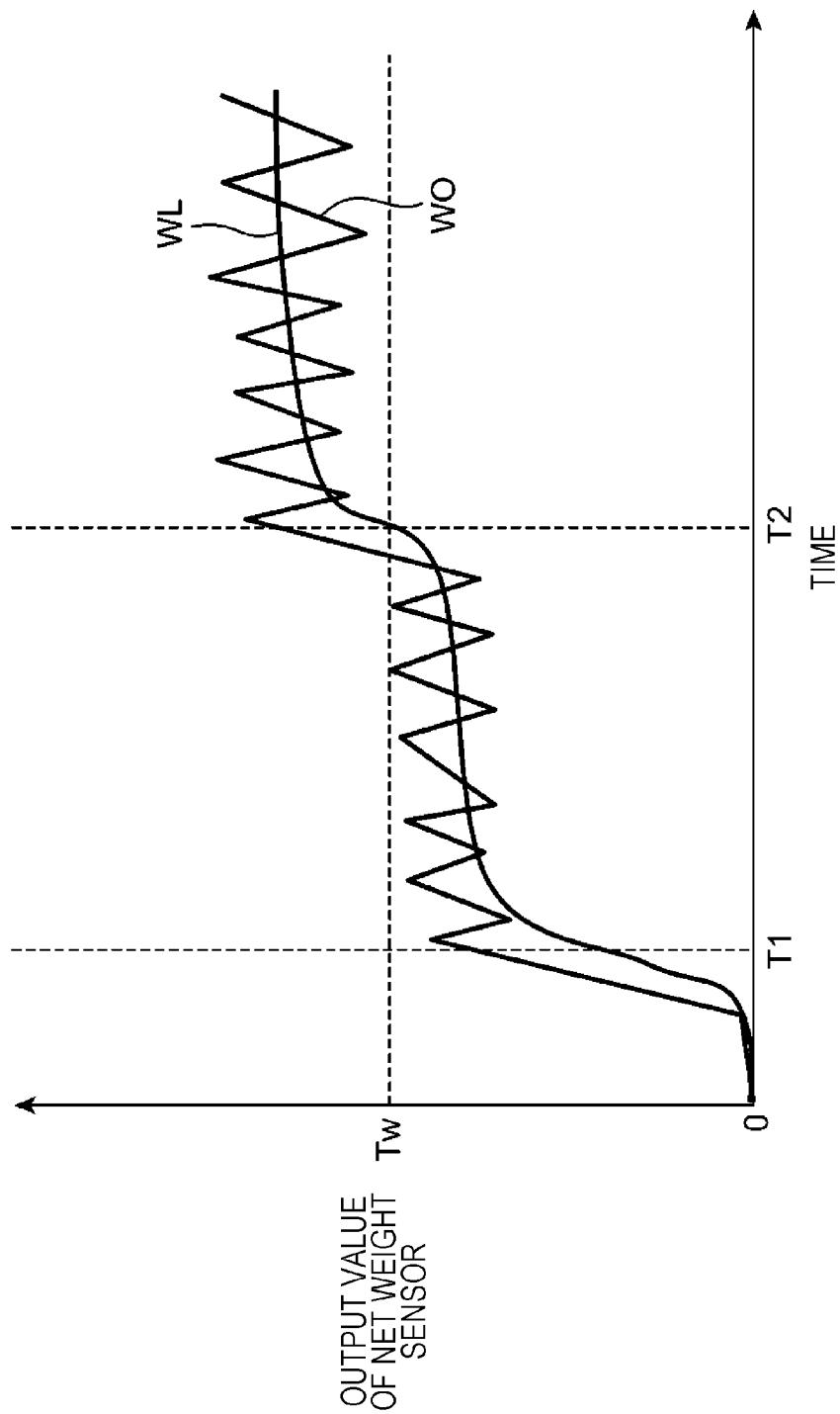
FIG. 7 is a graph for explaining an exemplary determination method of a weight capture determining unit with respect to the output value of a net weight sensor shown in FIG. 1.

Next, the weight capture determining unit 109 is described in detail. FIG. 7 is a graph for explaining an exemplary determination method of the weight capture determining unit 109 with respect to the output value of the net weight sensor 103 shown in FIG. 1. In FIG. 7, the horizontal axis plots the time, and the vertical axis plots the output value of the net weight sensor 103.

When the operator of the capture drone 100 finds a suspicious drone 200, the operator operates the remote control 300 to cause the capture drone 100 to take off and capture the suspicious drone 200. In this case, as shown in FIG. 7, if the take-off of the capture drone 100 is completed in a period from the start of the take-off (time 0) of the capture drone 100 to a take-off completion time T1 and then the capture drone 100 captures the suspicious drone 200, an output value WO of the net weight sensor 103 increases at a capture detection time T2.

In this case, noise and the like are superimposed on the output value WO of the net weight sensor 103, and the range of fluctuation is large. In contrast, regarding an output value WL filtered by the low-pass filter of the weight capture determining unit 109, the noise and the like are removed, the output value WL smoothly changes, and the output value WL correctly represents the total weight of the capture net 112.

The weight capture determining unit 109 presets a predetermined detection threshold Tw with respect to the weight (for example, an output value indicating a weight obtained by adding the weight of the capture net 112 and the weight of the suspicious drone 200 to each other). The weight capture determining unit 109 determines that the take-off has been completed at the take-off completion time T1, and then determines that the output value WL filtered by the low-pass filter is the capture detection threshold Tw or larger at the capture detection time T2. Hence, the weight capture determining unit 109 determines the capture of the suspicious drone 200.

In the above-described determination, the weight capture determining unit 109 detects the capture of the suspicious drone 200 if the output value WL filtered by the low-pass filter of the weight capture determining unit 109 is the capture detection threshold Tw or larger. However, the determination is not particularly limited to this example, and various modifications can be made. For example, the weight capture determining unit 109 may determine the capture of the suspicious drone 200 by determining that an increase amount of the weight measured by the net weight sensor 103, that is, an increase amount of the output value filtered by the low-pass filter of the weight capture determining unit 109 (for example, an increase amount from the average output value in a period from the take-off completion time T1 to the capture detection time T2) is a predetermined value or larger.

Next, the autonomous flight controller 111 is described in detail. The autonomous flight controller 111 notifies the remote control 300 through the communication unit 107 that the suspicious drone 200 has been captured and that the flight of the capture drone 100 is switched to the autonomous flight. When the remote control 300 receives the notification of the capture drone 100 through the communication unit 304, the controller 301 controls the display 302 to display a message indicating that the suspicious drone 200 has been captured and the capture drone 100 is switched to the autonomous flight.

Figure 8:
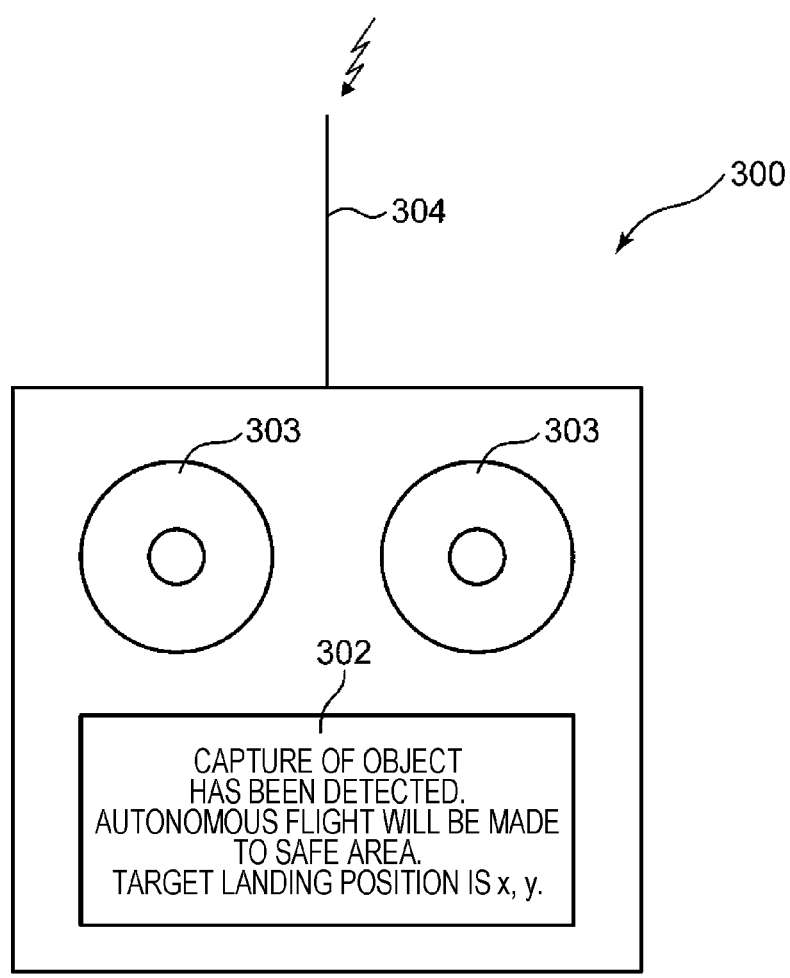
FIG. 8 illustrates an exemplary display screen of the remote control for making a notification that the flight of the capture drone is switched to autonomous flight after the capture of the suspicious drone.

FIG. 8 illustrates an exemplary display screen of the remote control 300 for making a notification that the flight of the capture drone 100 is switched to the autonomous flight after the capture of the suspicious drone 200. Referring to FIG. 8, the display 302 of the remote control 300 displays a message "Capture of object has been detected. Autonomous flight will be made to safe area." indicating that the suspicious drone 200 has been captured and the capture drone 100 has been switched to the autonomous flight. By displaying such a display screen on the display 302, the operator can recognize that the suspicious drone 200 has been captured and that the flight of the capture drone 100 has been switched to the autonomous flight.

Also, the autonomous flight controller 111 of the capture drone 100 determines a safe area being the nearest from a current position with reference to the safe area map storage 102, and generates a flight route to the nearest safe area. At this time, the autonomous flight controller 111 makes a notification through the communication unit 107 about a destination of the suspicious drone 200.

When the remote control 300 receives the notification of the capture drone 100 through the communication unit 304, the controller 301 controls the display 302 to display the destination of the capture drone 100. In this case, as shown in FIG. 8, the display 302 of the remote control 300 displays a message "Target landing position is x, y." indicating the destination of the suspicious drone 200. Since the display 302 displays the display screen, the operator can recognize the destination of the suspicious drone 200 and the flight route for the destination. Hence the operator can evacuate from the flight route.

The notification about the information on the destination of the suspicious drone 200 may be made to another device that is used by, for example, another worker who captures the suspicious drone 200 together with the operator, in addition to the remote control 300. The message that is displayed on the display 302 is not particularly limited to the above-described example. For example, the destination of the suspicious drone 200 may be indicated on a map, and the flight route including the destination of the suspicious drone 200 may be also displayed.

Figure 9:
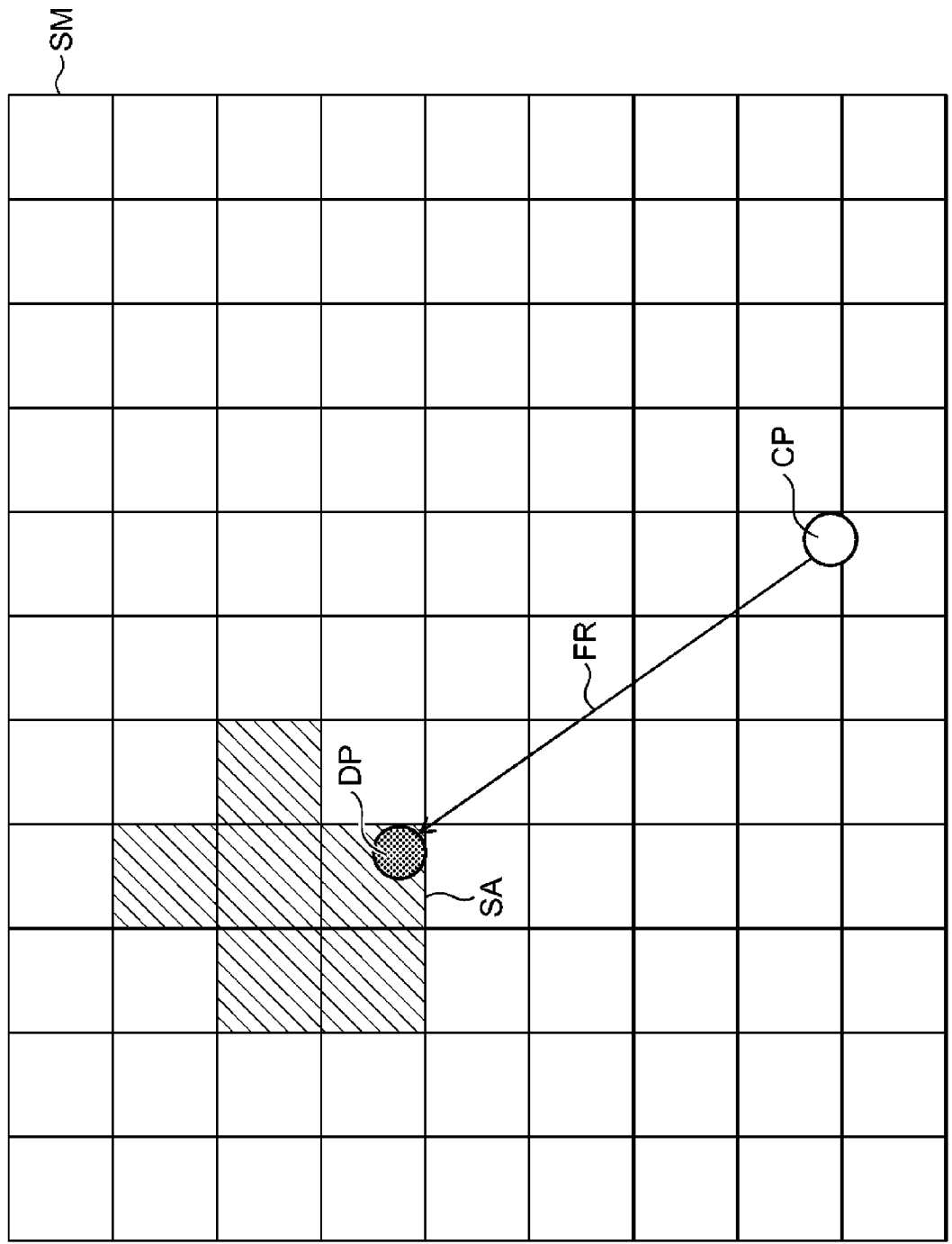
FIG. 9 is an illustration for explaining an exemplary method of determining a destination and a flight route of the suspicious drone by using a safe area map in a safe area map storage shown in FIG. 1.

FIG. 9 is an illustration for explaining an exemplary method of determining a destination and a flight route of the suspicious drone 200 by using a safe area map in the safe area map storage 102 shown in FIG. 1. As shown in FIG. 9, the safe area map storage 102 stores, for example, information on a safe area map SM in which portions with hatching indicate safe areas SA, such as a riverside, a seaside, a forest, a river, a lake, and a sea. In the example shown in FIG. 9, a flight route FR connecting a current position CP and a destination DP of the capture drone 100 is indicated on the safe area map SM.

The autonomous flight controller 111 detects position information indicating the current position CP of the capture drone 100 from the GPS unit 105. The autonomous flight controller 111 determines a safe area SA being the nearest from position information indicating the current position CP on the safe area map SM, as a destination DP, and generates a route connecting the current position CP and the destination DP, as a flight route FR. Accordingly, the destination DP is set in the safe area being the nearest from the current position CP.

The autonomous flight controller 111 controls the drivers 106 on the basis of the generated flight route FR, moves the suspicious drone 200 to the safe area being the nearest from the position at which the suspicious drone 200 has been captured (for example, the current position CP), and allows the capture drone 100 to land on the ground or water, or allows the capture drone 100 to drop the suspicious drone 200.

Also, the autonomous flight controller 111 makes a notification through the communication unit 107 that the capture drone 100 has moved the suspicious drone 200 to the destination DP. When the remote control 300 receives the notification of the capture drone 100 through the communication unit 304, the controller 301 controls the display 302 to display a message indicating that the capture drone 100 has moved the suspicious drone 200 to the destination DP.

Figure 10:
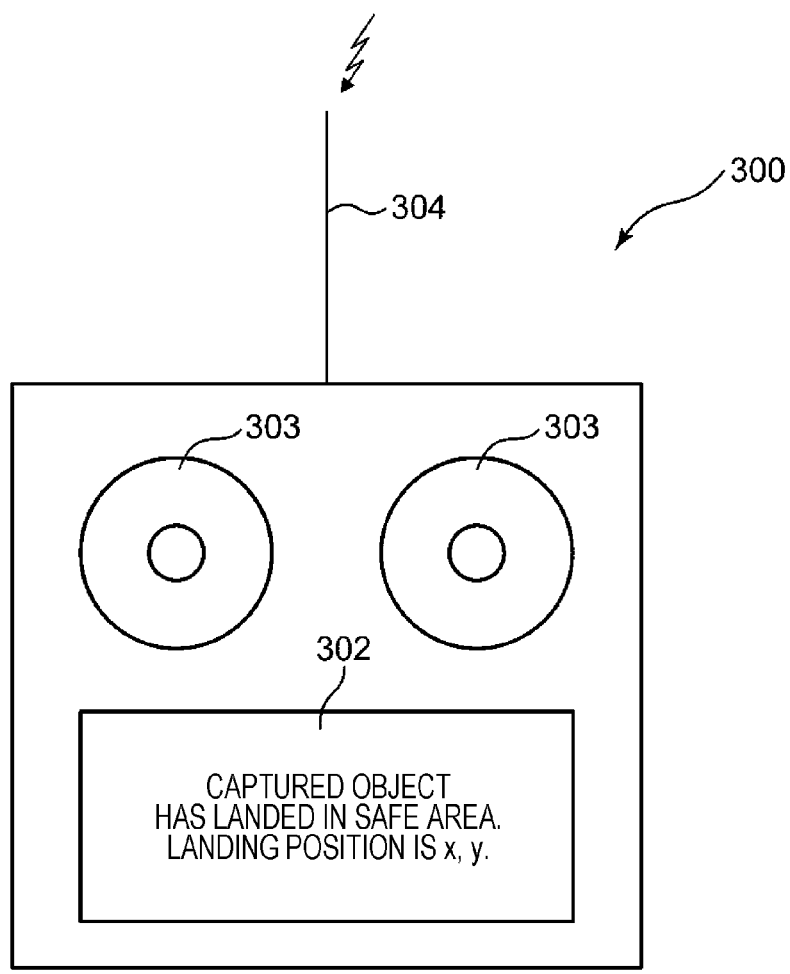
FIG. 10 is an illustration showing an exemplary display screen of the remote control for making a notification that the capture drone has moved to a safe area after the capture of the suspicious drone.

FIG. 10 is an illustration showing an exemplary display screen of the remote control for making a notification that the capture drone 100 has moved to the safe area after the capture of the suspicious drone 200. As shown in FIG. 10, a message "Captured object has landed in safe area. Landing Position is x, y." indicating that the capture drone 100 has moved the suspicious drone 200 to the destination DP is displayed on the display 302 of the remote control 300. By displaying such a display screen on the display 302, the operator can recognize that the capture drone 100 has moved the suspicious drone 200 to the destination DP.

While the capture drone 100 has the safe area map in the above description, it is not limited thereto. The capture drone 100 may acquire a safe area map from the outside if required. Various modifications can be made. For example, the safe area map storage 102 may be omitted, and a safe area map may be acquired from an external server or the like that stores the safe area map through the communication unit 107.

Also, while the capture drone 100 determines the destination of the suspicious drone 200 in the above description, it is not limited thereto. For example, when the capture drone 100 captures the suspicious drone 200, the capture drone 100 may notify an external device such as a server about position information of the capture drone 100, the external device may determine the destination of the suspicious drone 200, and the capture drone 100 may acquire the determined destination.

For another example, when the autonomous flight controller 111 cannot determine the safe area being the nearest from the current position with reference to the safe area map storage 102, the autonomous flight controller 111 may notify the remote control 300 through the communication unit 107 that the safe area being the nearest from the current position cannot be determined, the control switching unit 110 may switch the control of the flight from the autonomous flight by the autonomous flight controller 111 to the manual flight by the flight controller 108, and the operator may perform the subsequent flight by manual operation. This point may be applied to the other embodiments.

Figure 11:
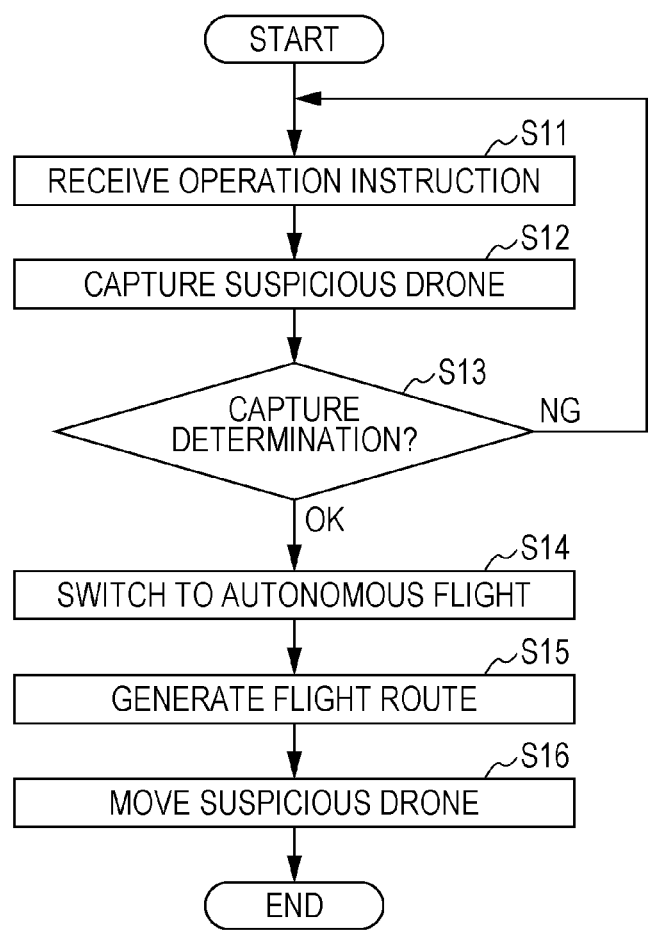
FIG. 11 is a flowchart showing exemplary processing of capturing the suspicious drone by the capture drone shown in FIG. 1.

Next, processing of capturing the suspicious drone 200 by the capture drone 100 is described. FIG. 11 is a flowchart showing exemplary processing of capturing the suspicious drone 200 by the capture drone 100 shown in FIG. 1.

First, the communication unit 107 of the capture drone 100 receives an operation instruction (a capture instruction for the suspicious drone 200) from the remote control 300 (step S11).

Then, the flight controller 108 controls the drivers 106 and captures the suspicious drone 200 in response to the operation instruction from the remote control 300 (step S12).

Then, the weight capture determining unit 109 determines whether the suspicious drone 200 has been captured or not on the basis of the weight of the capture net 112 measured by the net weight sensor 103 (step S13). If the weight capture determining unit 109 determines that the suspicious drone 200 has not been captured (NG in step S13), the processing returns to step S11 and continues step S11 and subsequent steps.

In contrast, if the weight capture determining unit 109 determines that the suspicious drone 200 has been captured (OK in step S13), the weight capture determining unit 109 notifies the control switching unit 110 about the determination result, the control switching unit 110 receives the input of the determination result, and the control switching unit 110 switches the control of the flight from the manual flight by the flight controller 108 to the autonomous flight by the autonomous flight controller 111 (step S14). At this time, the autonomous flight controller 111 notifies the remote control 300 through the communication unit 107 that the control of flight of the capture drone 100 is switched to the autonomous flight.

Then, the autonomous flight controller 111 determines the nearest safe area on the basis of the position information from the GPS unit 105 with reference to the safe area map storage 102, and generates the flight route to the nearest safe area (step S15).

Then, the autonomous flight controller 111 controls the drivers 106 on the basis of the generated flight route, moves the suspicious drone 200 to the safe area being the nearest from the position at which the suspicious drone 200 has been captured, and allows the capture drone 100 to land on the ground or water, or allows the capture drone 100 to drop the suspicious drone 200 (step S16).

As described above, the capture drone 100 according to this embodiment includes the communication unit 107 that receives the operation instruction for the capture drone 100, the drivers 106 that cause the capture drone 100 to fly, the controller 101 that controls the drivers 106 on the basis of the operation instruction, the capture net 112 that captures the object in the air, and the net weight sensor 103 that detects the weight of the capture net 112. The controller 101 switches the control of the flight to the autonomous flight if the increase in weight is the predetermined value or larger. Accordingly, the capture drone 100 can avoid an operation accident by manual operation due to a sudden change in weight after the capture drone 100 captures the suspicious drone 200 being the object in the air.

Also, the capture drone 100 according to this embodiment further includes the GPS unit 105 that detects the position information of the capture drone 100, and the safe area map storage 102 that stores the safe area map for moving the suspicious drone 200. The controller 101 determines the destination that is the safe area being the nearest from the position information of the safe area map, and moves the capture drone 100 toward the destination. Accordingly, the capture drone 100 can move to the safe area the most fast by the autonomous flight after the capture drone 100 captures the suspicious drone 200.

While the capture drone 100 executes the control to switch the control of the flight to the autonomous flight after it is determined that the capture drone 100 has captured the suspicious drone 200 in this embodiment, it is not limited thereto. For example, the capture drone 100 may notify the remote control 300 about the determination that the capture drone 100 has captured the suspicious drone 200, the operator may perform an operation of switching the control of the flight of the capture drone 100 to the autonomous flight by using the remote control 300, and hence the control of the flight of the capture drone 100 may be switched to the autonomous flight.

Also, the capture drone 100 may determine whether the capture drone 100 has captured the suspicious drone 200 or not by using a unit other than the net weight sensor 103. For example, a current sensor, a rotation speed sensor, or another sensor may be used as described below instead of the net weight sensor 103.

First Modification

Figure 12:
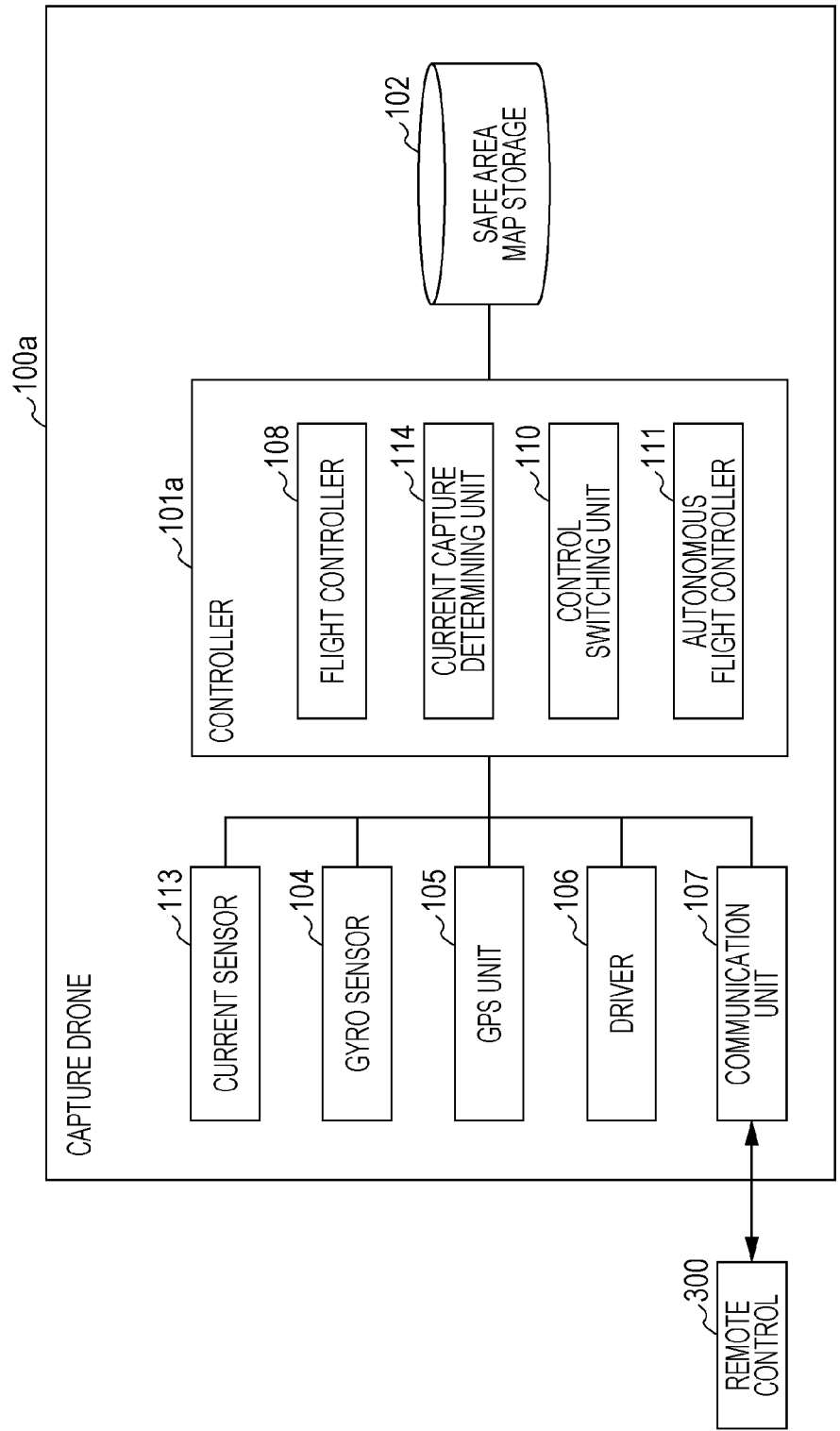
FIG. 12 is a block diagram showing an exemplary configuration of a capture drone according to a first modification of the first embodiment of the present disclosure.
Figure 13:
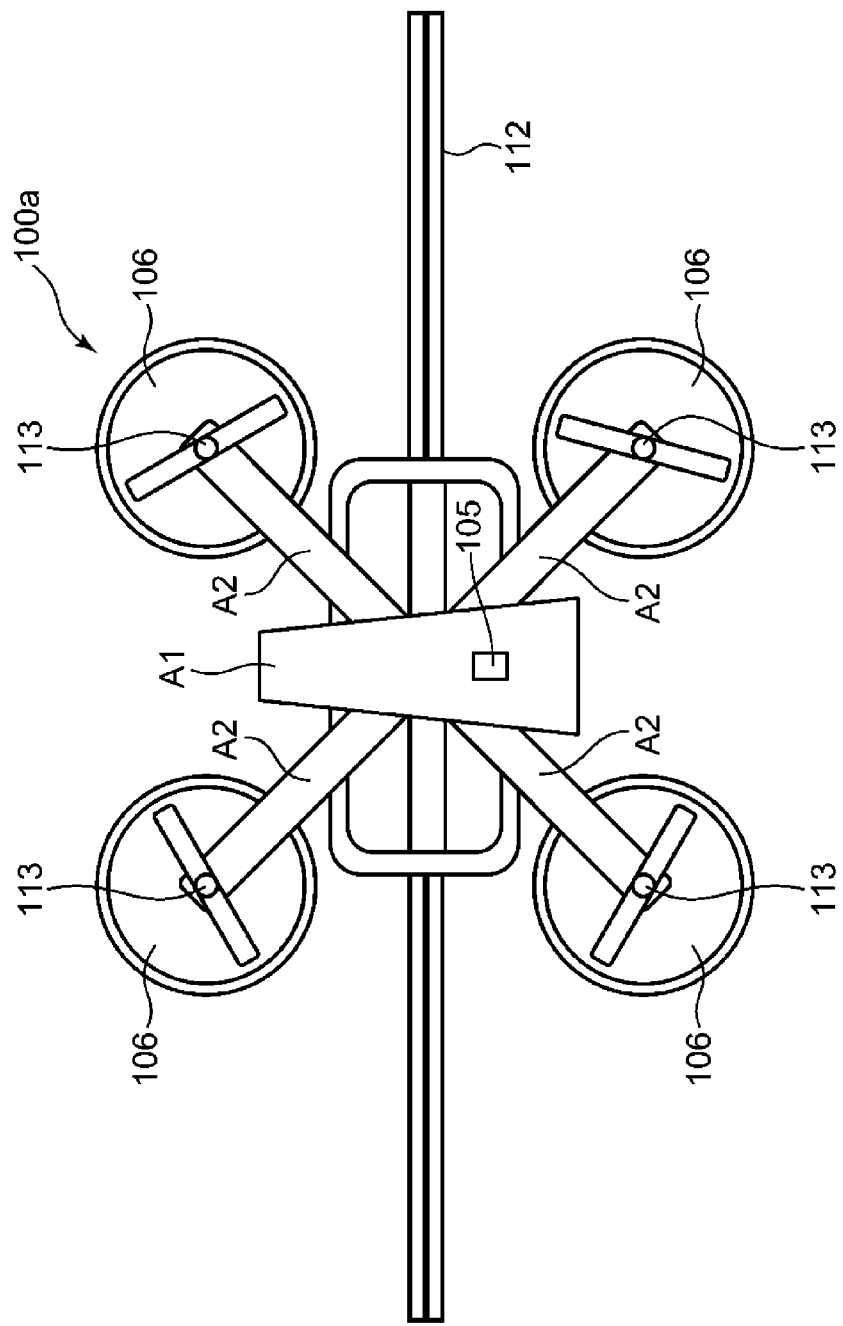
FIG. 13 is an external view from an upper surface of the capture drone shown in FIG. 12.

An example of using a current sensor instead of the net weight sensor is described as a first modification of this embodiment. FIG. 12 is a block diagram showing an exemplary configuration of a capture drone 100a according to the first modification of the first embodiment of the present disclosure. FIG. 13 is an external view from an upper surface of the capture drone 100a shown in FIG. 12. To simplify illustration, four current sensors 113 shown in FIG. 13 are illustrated as a single current sensor 113 in FIG. 12.

The capture drone 100a shown in FIGS. 12 and 13 differs from the capture drone 100 shown in FIGS. 1 and 2 in that the current sensors 113 are provided instead of the net weight sensor 103, the controller 101 is changed to a controller 101a, and the weight capture determining unit 109 of the controller 101 is changed to a current capture determining unit 114 of the controller 101a. The other configuration of the capture drone 100a is similar to that of the capture drone 100. The same reference sign is applied to the same part, and the detailed description thereof is omitted.

The controller 101a controls the current sensors 113, the gyro sensor 104, the GPS unit 105, the drivers 106, and the communication unit 107.

The four current sensors 113 are sensors that measure driving currents flowing through four motors (not shown) included in the drivers 106 of the capture drone 100a. When a suspicious drone 200 is captured with the capture net 112, the currents flowing through the drivers 106 of the capture drone 100a increase, and the current sensors 113 measure the increased driving currents. While the current capture determining unit 114 performs determination (described later) by using the average value of the driving currents of the four motors measured by the four current sensors 113, the configuration of the current sensors is not particularly limited to this example. Various modifications can be made. For example, the total value of the driving currents of the four motors may be measured, or the driving current of one of the motors as a representative value may be measured.

The current capture determining unit 114 determines whether the suspicious drone 200 has been captured or not on the basis of the average value of the current values measured by the four current sensors 113. The current capture determining unit 114 includes a low-pass filter that filters the current values measured by the current sensors 113. If the current capture determining unit 114 determines that the suspicious drone 200 has been captured, the current capture determining unit 114 notifies the control switching unit 110 about the determination result.

Figure 14:
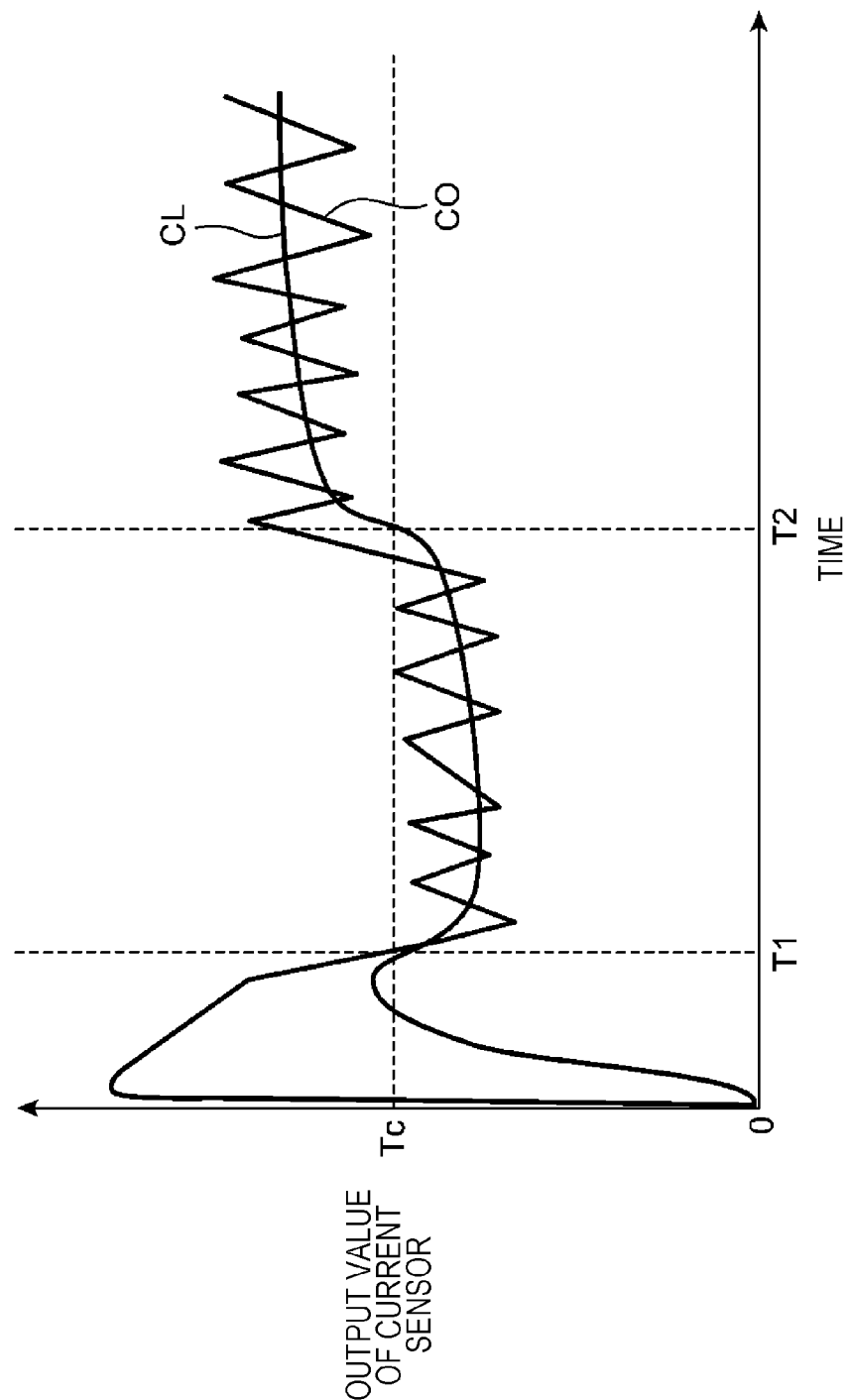
FIG. 14 is a graph for explaining an exemplary determination method of a current capture determining unit with respect to the output value of a current sensor shown in FIG. 12.

Next, the current capture determining unit 114 is described in detail. FIG. 14 is a graph for explaining an exemplary determination method of the current capture determining unit 114 with respect to the output value of the current sensors 113 shown in FIG. 12. In FIG. 14, the horizontal axis plots the time, and the vertical axis plots the average value of the output values of the four current sensors 113.

When the operator of the capture drone 100a finds a suspicious drone 200, the operator operates the remote control 300 to cause the capture drone 100a to take off and capture the suspicious drone 200. In this case, as shown in FIG. 14, if the take-off of the capture drone 100a is completed in a period from the start of the take-off (time 0) of the capture drone 100a to a take-off completion time T1 and then the capture drone 100a captures the suspicious drone 200, an average value CO of the output values of the current sensors 113 increases at a capture detection time T2.

In this case, noise and the like are superimposed on the average value CO of the output values of the four current sensors 113, and the range of fluctuation is large. In contrast, regarding an output value CL filtered by the low-pass filter of the current capture determining unit 114, the noise and the like are removed, the output value CL smoothly changes, and the output value CL correctly represents the average value of the driving current of the drivers 106.

The current capture determining unit 114 presets a predetermined capture detection threshold Tc with respect to the driving currents (for example, an output value indicating the average value of the driving currents for causing the capture drone 100a to fly after the capture drone 100a captures the suspicious drone 200). At start of flight, large currents flow through the drivers 106. Hence, the current capture determining unit 114 determines that the suspicious drone 200 has been captured by determining that the output value CL filtered by the low-pass filter at the capture detection time T2 is the capture detection threshold Tc or larger, after a predetermined period elapses since the start of flight, for example, at the take-off completion time T1 at which the completion of the take-off has been determined or later.

In the above-described determination, the current capture determining unit 114 detects the capture of the suspicious drone 200 if the output value CL filtered by the low-pass filter of the current capture determining unit 114 is the capture detection threshold Tc or larger. However, the determination is not particularly limited to this example, and various modifications can be made. For example, the current capture determining unit 114 may determine the capture of the suspicious drone 200 by determining that increase amounts of the driving currents measured by the current sensors 113, that is, an increase amount of the output value filtered by the low-pass filter of the current capture determining unit 114 (for example, an increase amount from the average output value in a period from the take-off completion time T1 to the capture detection time T2) is a predetermined value or larger.

Second Modification

Figure 15:
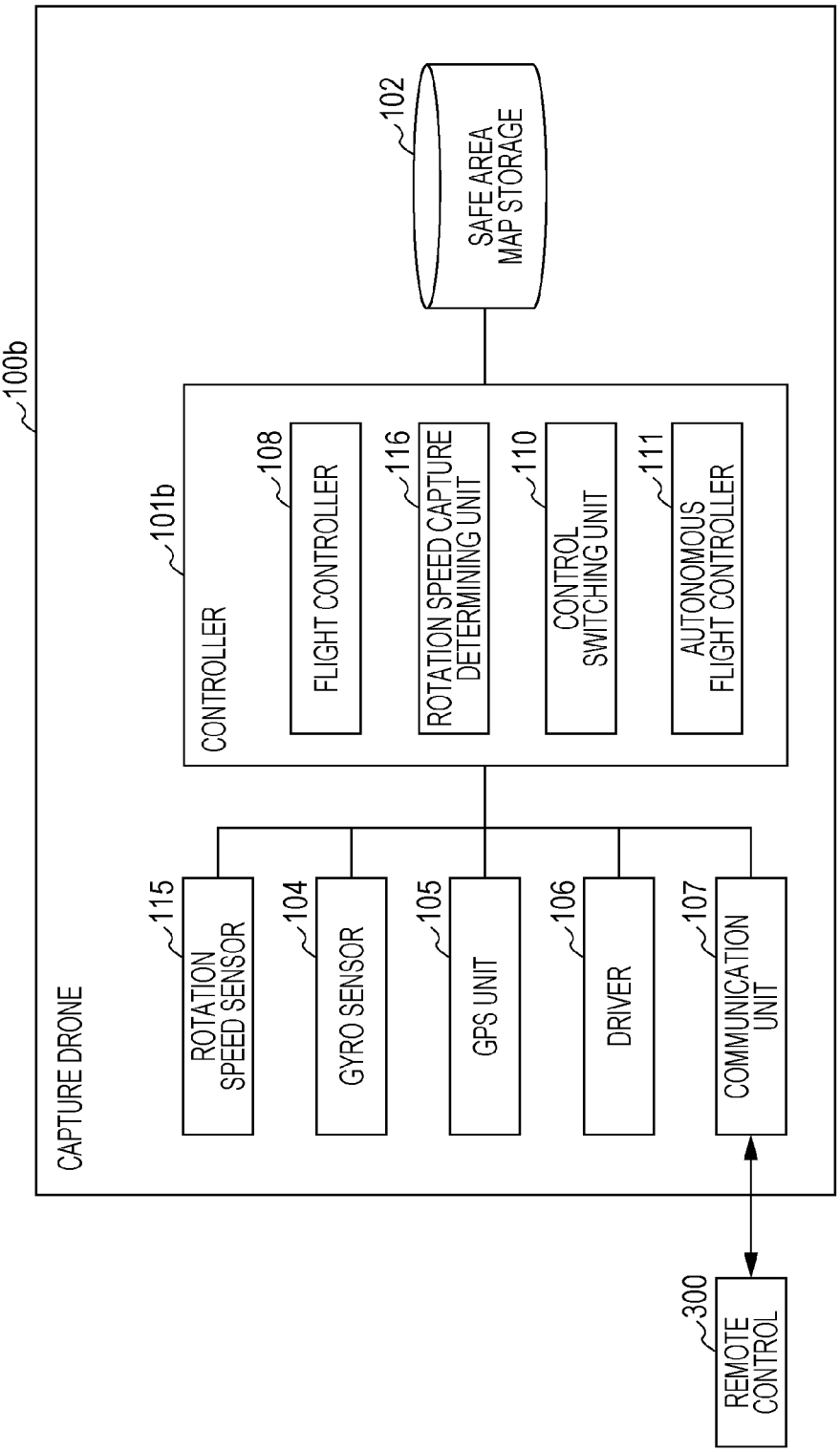
FIG. 15 is a block diagram showing an exemplary configuration of a capture drone according to a second modification of the first embodiment of the present disclosure.
Figure 16:
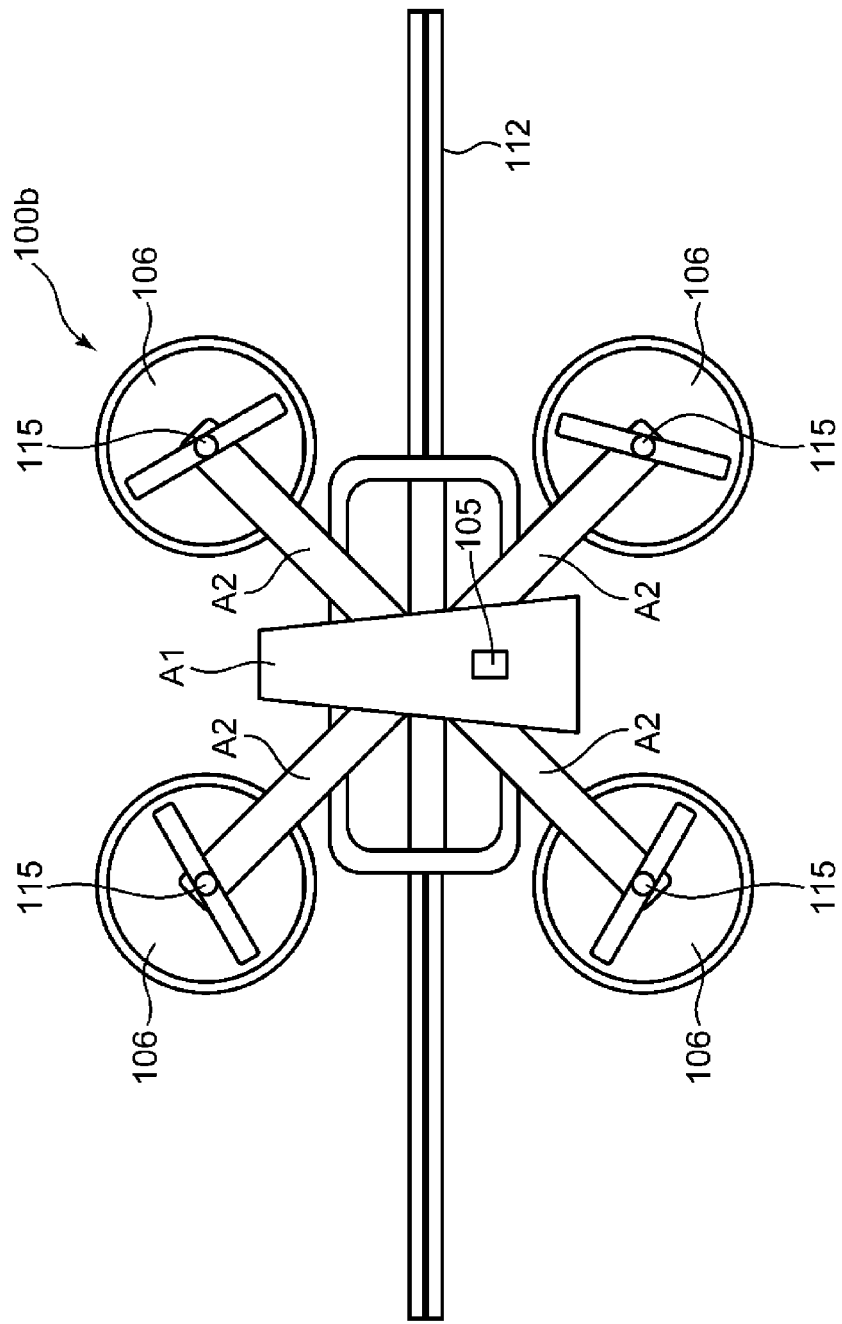
FIG. 16 is an external view from an upper surface of the capture drone shown in FIG. 15.

An example of using a rotation speed sensor instead of the net weight sensor is described as a second modification of this embodiment. FIG. 15 is a block diagram showing an exemplary configuration of a capture drone 100b according to the second modification of the first embodiment of the present disclosure. FIG. 16 is an external view from an upper surface of the capture drone 100b shown in FIG. 15. To simplify illustration, four rotation speed sensors 115 shown in FIG. 16 are illustrated as a single rotation speed sensor 115 in FIG. 15.

The capture drone 100b shown in FIGS. 15 and 16 differs from the capture drone 100 shown in FIGS. 1 and 2 in that the rotation speed sensors 115 are provided instead of the net weight sensor 103, the controller 101 is changed to a controller 101b, and the weight capture determining unit 109 of the controller 101 is changed to a rotation speed capture determining unit 116 of the controller 101b. The other configuration of the capture drone 100b is similar to that of the capture drone 100. The same reference sign is applied to the same part, and the detailed description thereof is omitted.

The controller 101b controls the rotation speed sensors 115, the gyro sensor 104, the GPS unit 105, the drivers 106, and the communication unit 107.

The four rotation speed sensors 115 are sensors that are connected to four motors (not shown) included in the drivers 106 of the capture drone 100b and that each measure the rotation speed of corresponding one of the motors. When a suspicious drone 200 is captured with the capture net 112, the rotation speeds of the drivers 106 of the capture drone 100b increase, and the rotation speed sensors 115 measure the increased rotation speeds. While the rotation speed capture determining unit 116 performs determination (described later) by using the average value of the rotation speeds of the four motors measured by the four rotation speed sensors 115, the configuration of the rotation speed sensors is not particularly limited to this example. Various modifications can be made. For example, the rotation speed of one of the motors may be measured as a representative value.

The rotation speed capture determining unit 116 determines whether the suspicious drone 200 has been captured or not on the basis of the average value of the rotation speeds measured by the four rotation speed sensors 115. The rotation speed capture determining unit 116 includes a low-pass filter that filters the rotation speeds measured by the rotation speed sensors 115. If the rotation speed capture determining unit 116 determines that the suspicious drone 200 has been captured, the rotation speed capture determining unit 116 notifies the control switching unit 110 about the determination result.

Figure 17:
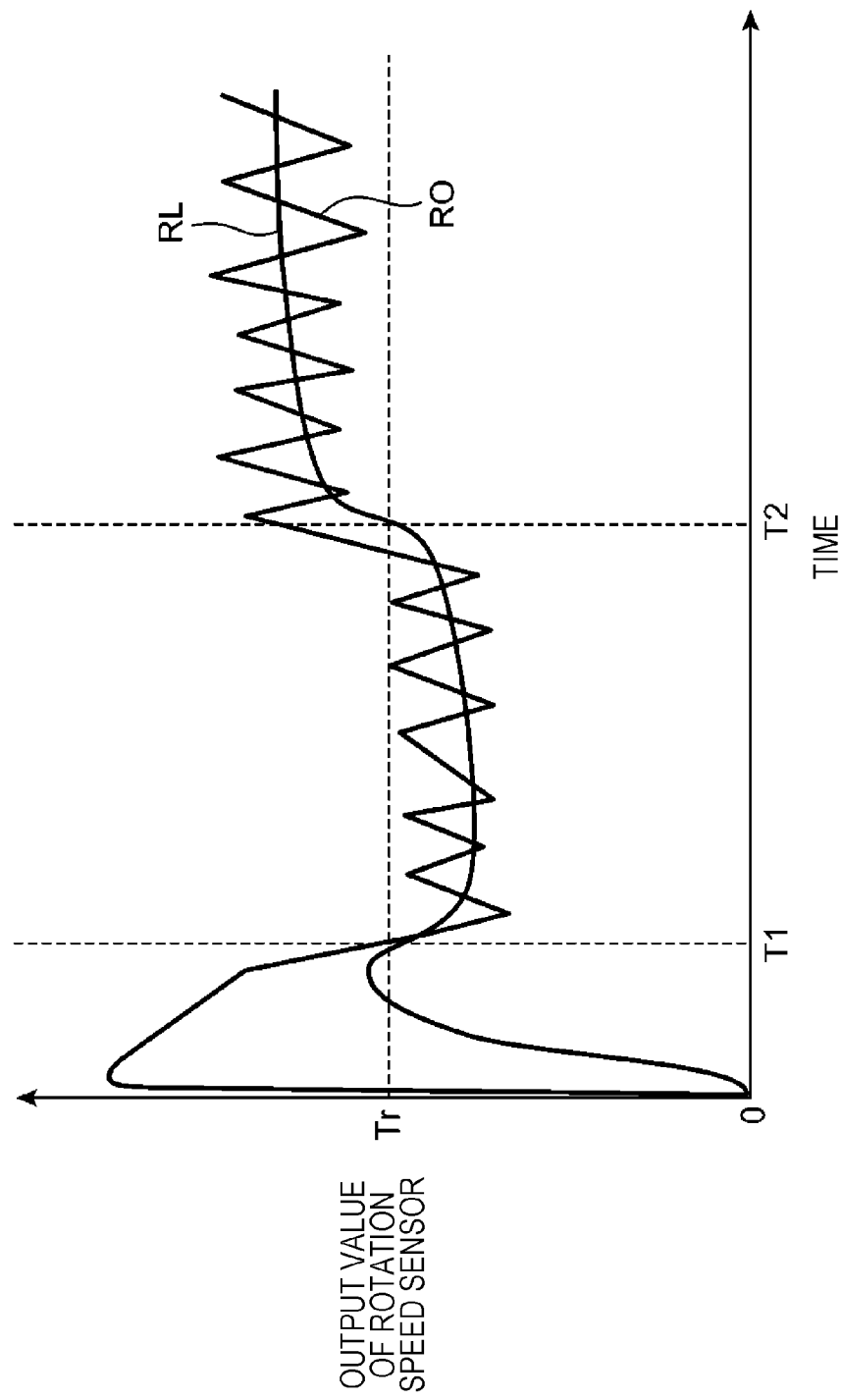
FIG. 17 is a graph for explaining an exemplary determination method of a rotation speed capture determining unit with respect to the output value of a rotation speed sensor shown in FIG. 16.

Next, the rotation speed capture determining unit 116 is described in detail. FIG. 17 is a graph for explaining an exemplary determination method of the rotation speed capture determining unit 116 with respect to the output value of the rotation speed sensors 115 shown in FIG. 16. In FIG. 17, the horizontal axis plots the time, and the vertical axis plots the average value of the output values of the four rotation speed sensors 115.

When the operator of the capture drone 100*b* finds a suspicious drone 200, the operator operates the remote control 300 to cause the capture drone 100*b* to take off and capture the suspicious drone 200. In this case, as shown in FIG. 17, if the take-off of the capture drone 100*b* is completed in a period from the start of the take-off (time 0) of the capture drone 100*b* to a take-off completion time T1 and then the capture drone 100*b* captures the suspicious drone 200, an average value RO of the output values of the four rotation speed sensors 115 increases at a capture detection time T2.

In this case, noise and the like are superimposed on the average value RO of the output values of the four rotation speed sensors 115, and the range of fluctuation is large. In contrast, regarding an output value RL filtered by the low-pass filter of the rotation speed capture determining unit 116, the noise and the like are removed, the output value RL smoothly changes, and the output value RL correctly represents the average value of the rotation speeds of the drivers 106.

The rotation speed capture determining unit 116 presets a predetermined capture detection threshold Tr with respect to the rotation speeds (for example, an output value indicating the average value of the rotation speeds for causing the capture drone 100*b* to fly after the capture drone 100*b* captures the suspicious drone 200). At start of flight, the rotation speeds increase. Hence, the rotation speed capture determining unit 116 determines that the suspicious drone 200 has been captured by determining that the output value RL filtered by the low-pass filter at the capture detection time T2 is the capture detection threshold Tr or larger, after a predetermined period elapses since the start of flight, for example, at the take-off completion time T1 at which the completion of the take-off has been determined or later.

In the above-described determination, the rotation speed capture determining unit 116 detects the capture of the suspicious drone 200 if the output value RL filtered by the low-pass filter of the rotation speed capture determining unit 116 is the capture detection threshold Tr or larger. However, the determination is not particularly limited to this example, and various modifications can be made. For example, the rotation speed capture determining unit 116 may determine the capture of the suspicious drone 200 by determining that increase amounts of the rotation speeds measured by the rotation speed sensors 115, that is, an increase amount of the output value filtered by the low-pass filter of the rotation speed capture determining unit 116 (for example, an increase amount from the average output value in a period from the take-off completion time T1 to the capture detection time T2) is a predetermined value or larger.

Second Embodiment

While the capture drone 100 according to the first embodiment determines whether the suspicious drone 200 has been captured or not on the basis of the weight detected by the net weight sensor 103, it is determined whether a capture drone has captured a suspicious drone or not with regard to the wind speed measured by using an anemometer in addition to the weight detected by using the net weight sensor 103 in this embodiment. Also in this embodiment, the current sensor or the rotation speed sensor may be used instead of the net weight sensor similarly to the first embodiment.

Figure 18:
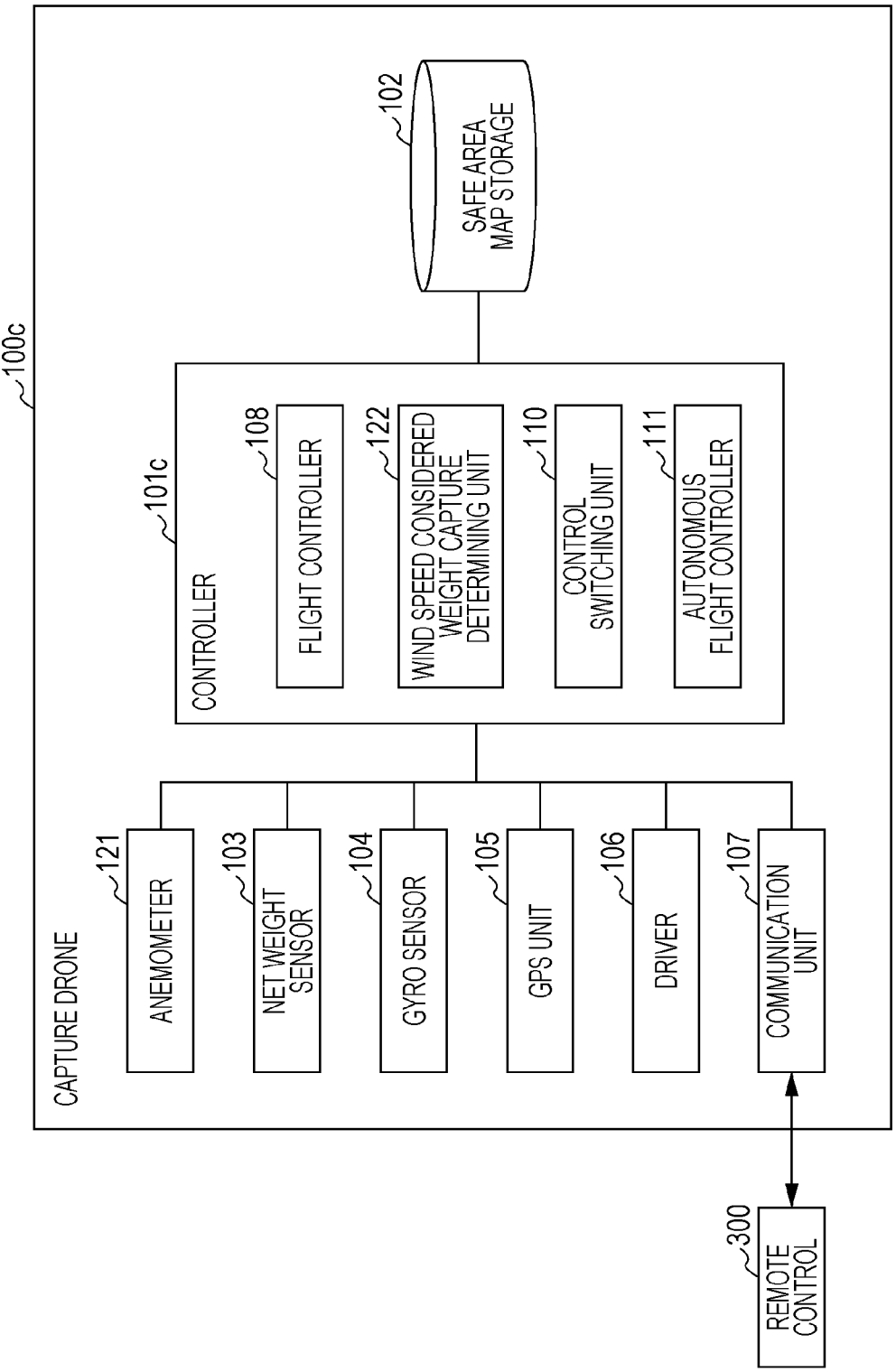
FIG. 18 is a block diagram showing an exemplary configuration of a capture drone according to a second embodiment of the present disclosure.
Figure 19:
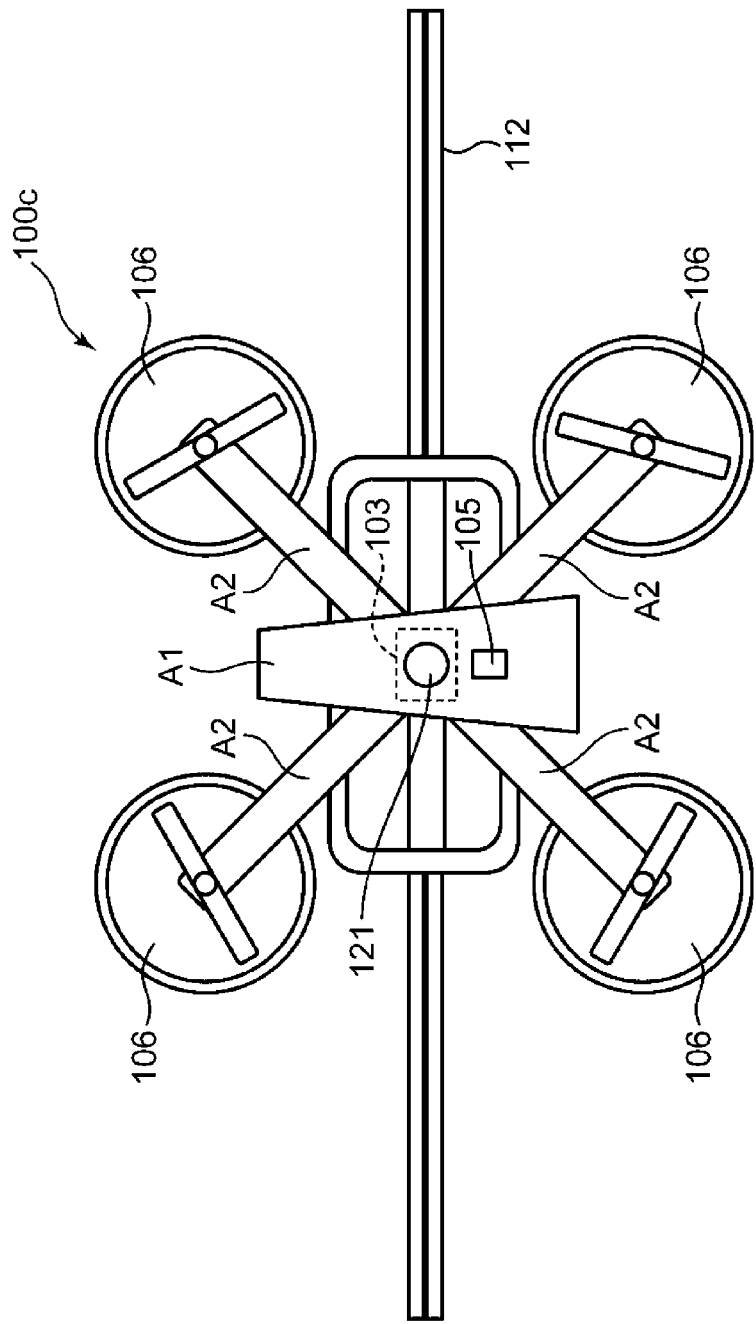
FIG. 19 is an external view from an upper surface of the capture drone shown in FIG. 18.

FIG. 18 is a block diagram showing an exemplary configuration of a capture drone 100*c* according to a second embodiment of the present disclosure. FIG. 19 is an external view from an upper surface of the capture drone 100*c* shown in FIG. 18.

The capture drone 100*c* shown in FIGS. 18 and 19 differs from the capture drone 100 shown in FIGS. 1 and 2 in that an anemometer 121 is added, the controller 101 is changed to a controller 101*c*, and the weight capture determining unit 109 of the controller 101 is changed to a wind speed considered weight capture determining unit 122 of the controller 101*c*. The other configuration of the capture drone 100*c* is similar to that of the capture drone 100. The same reference sign is applied to the same part, and the detailed description thereof is omitted.

The controller 101*c* controls the anemometer 121, the net weight sensor 103, the gyro sensor 104, the GPS unit 105, the drivers 106, and the communication unit 107.

The anemometer 121 is fixed to the main body section A1, and measures the wind speed relative to the capture drone 100*c* in an area around the capture drone 100*c*. For example, when the capture drone 100*c* moves at a speed A and the wind speed of the head wind is a wind speed B, the wind speed relative to the capture drone 100*c* is a wind speed (A+B). When the wind speed of the tail wind is a wind speed C, the wind speed relative to the capture drone 100*c* is a wind speed (A−C).

The wind speed considered weight capture determining unit 122 determines whether the suspicious drone 200 has been captured or not on the basis of the weight measured by the net weight sensor 103 and the wind speed measured by the anemometer 121. The wind speed considered weight capture determining unit 122 includes a low-pass filter that filters the weight measured by the net weight sensor 103. If the wind speed considered weight capture determining unit 122 determines that the suspicious drone 200 has been captured, the wind speed considered weight capture determining unit 122 notifies the control switching unit 110 about the determination result.

Figure 20:
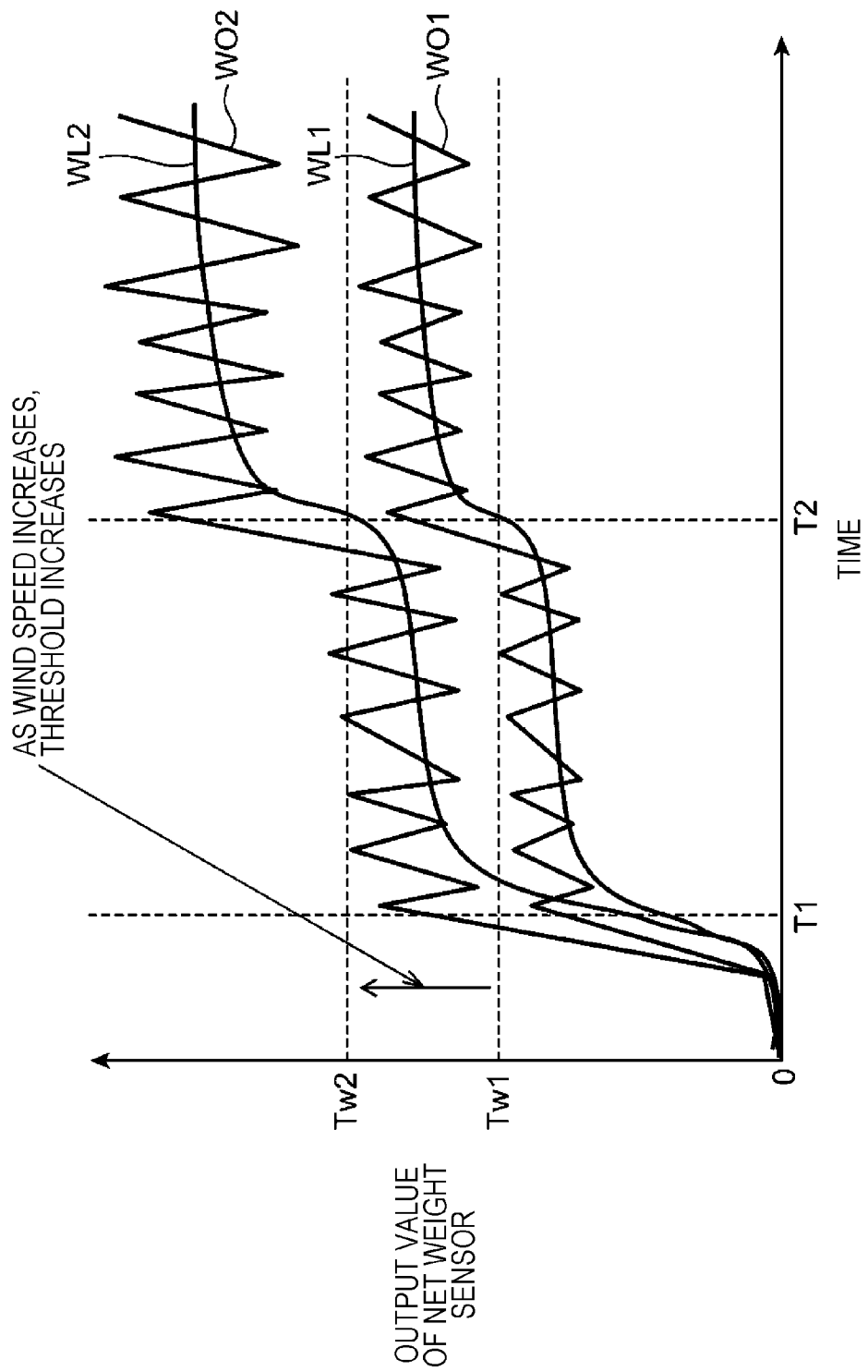
FIG. 20 is a graph for explaining an exemplary determination method of a wind speed considered weight capture determining unit with respect to the output value of the net weight sensor shown in FIG. 18.

Next, the wind speed considered weight capture determining unit 122 is described in detail. FIG. 20 is a graph for explaining an exemplary determination method of the wind speed considered weight capture determining unit 122 with respect to the output value of the net weight sensor 103 shown in FIG. 18. In FIG. 20, the horizontal axis plots the time, and the vertical axis plots the output value of the net weight sensor 103.

When the operator of the capture drone 100c finds a suspicious drone 200, the operator operates the remote control 300 to cause the capture drone 100c to take off and capture the suspicious drone 200. In this case, as shown in FIG. 20, if the take-off of the capture drone 100c is completed in a period from the start of the take-off (time 0) of the capture drone 100c to a take-off completion time T1 and then the capture drone 100c captures the suspicious drone 200, an output value WO1 of the net weight sensor 103 at low wind speed and an output value WO2 of the net weight sensor 103 at high wind speed increase at a capture detection time T2.

In this case, noise and the like are superimposed on each of the output value WO1 of the net weight sensor 103 at low wind speed and the output value WO2 of the net weight sensor 103 at high wind speed, and the range of fluctuation is large. In contrast, regarding an output value WL1 at low wind speed and an output value WL2 at high wind speed filtered by the low-pass filter of the wind speed considered weight capture determining unit 122, the noise and the like are removed, the output values WL1 and WL2 smoothly change, and the output values WL1 and WL2 each correctly represent the total weight of the capture net 112.

The wind speed considered weight capture determining unit 122 presets a predetermined detection threshold Tw1 with respect to the weight when the wind speed relative to the capture drone 100c is low and a predetermined detection threshold Tw2 with respect to the weight when the wind speed relative to the capture drone 100c is high (Tw1<Tw2).

If the relative wind speed is low, the wind speed considered weight capture determining unit 122 determines that the take-off has been completed at the take-off completion time T1, and then determines that the output value WL1 filtered by the low-pass filter is the capture detection threshold Tw1 or larger at the capture detection time T2. Hence, the wind speed considered weight capture determining unit 122 determines that the suspicious drone 200 has been captured. In contrast, if the relative wind speed is high, the wind speed considered weight capture determining unit 122 determines that the take-off has been completed at the take-off completion time T1, and then determines that the output value WL2 filtered by the low-pass filter is the capture detection threshold Tw2 or larger at the capture detection time T2. Hence, the wind speed considered weight capture determining unit 122 determines that the suspicious drone 200 has been captured.

Figure 21:
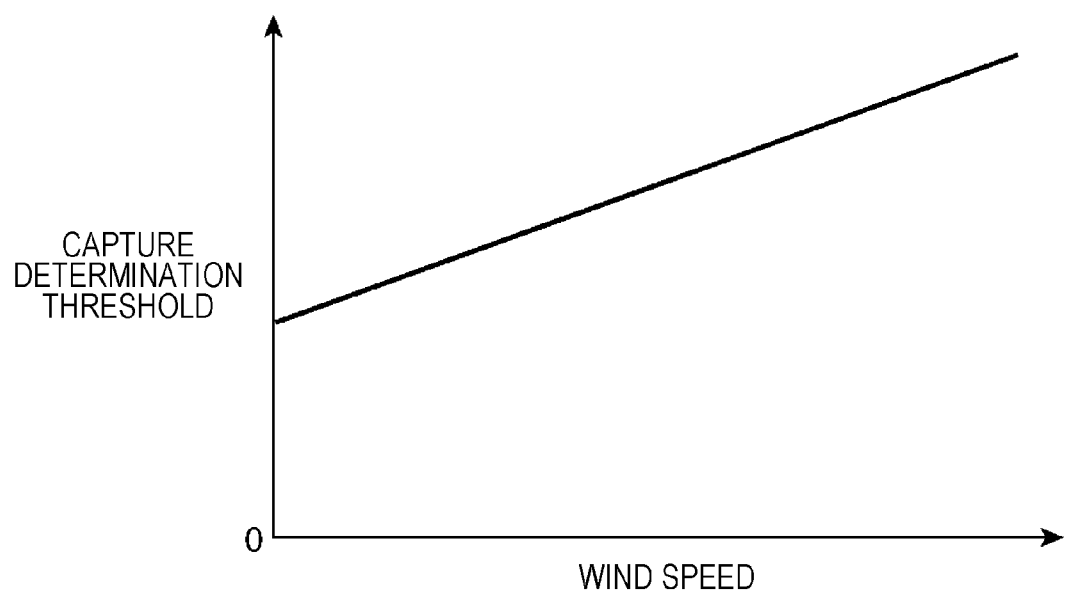
FIG. 21 is a graph showing an exemplary relationship between a relative wind speed and a capture determination threshold.

The capture detection thresholds used by the wind speed considered weight capture determining unit 122 do not have to be the two values in the case of the low relative wind speed and the case of the high relative wind speed, and a capture detection threshold may be determined in accordance with the wind speed. FIG. 21 is a graph showing an exemplary relationship between a relative wind speed and a capture determination threshold. In FIG. 21, the horizontal axis indicates the wind speed and the vertical axis indicates the capture detection threshold.

As shown in FIG. 21, the capture detection threshold increases in proportion to the relative wind speed. The wind speed considered weight capture determining unit 122 stores in advance a linear function indicating the relationship between the relative wind speed and the capture determination threshold shown in FIG. 21. The capture detection threshold is determined to increase as the relative wind speed increases, and determines the capture of the suspicious drone 200 by using the determined capture detection threshold. In this case, the capture of the suspicious drone 200 can be more correctly determined with regard to the relative wind speed. The relationship between the relative wind speed and the capture determination threshold is not particularly limited to the above-described example, and a quadratic function, an exponential function, or another relationship may be used.

As described above, the capture drone 100c according to this embodiment includes the communication unit 107 that receives the operation instruction for the capture drone 100c, the drivers 106 that cause the capture drone 100c to fly, the controller 101c that controls the drivers 106 on the basis of the operation instruction, the capture net 112 that captures the object in the air, the net weight sensor 103 that detects the weight of the capture net 112, and the anemometer 121 that measures the wind speed in the area around the capture drone 100c. The controller 101c sets a larger predetermined value (capture determination threshold) as the wind speed is higher, and switches the control of the flight to the autonomous flight if the increase in weight is the predetermined value or larger. Accordingly, the capture drone 100c can avoid an operation accident by manual operation due to a sudden change in weight after the capture drone 100c captures the suspicious drone 200 being the object in the air.

Also, the capture drone 100c according to this embodiment further includes the GPS unit 105 that detects the position information of the capture drone 100c, and the safe area map storage 102 that stores the safe area map for moving the suspicious drone 200. The controller 101c determines the destination that is the safe area being the nearest from the position information of the safe area map, and moves the capture drone 100c toward the destination. Accordingly, the capture drone 100c can move to the safe area the most fast by the autonomous flight after the capture drone 100c captures the suspicious drone 200.

Third Embodiment

In this embodiment, during movement to the destination by the autonomous flight after the suspicious drone 200 is captured, it is determined whether or not the suspicious drone 200 has fallen on the basis of the weight detected by the net weight sensor 103, similarly to the capture drone 100 in the first embodiment. In this embodiment, the current sensor or the rotation speed sensor may be used instead of the net weight sensor similarly to the first embodiment.

Figure 22:
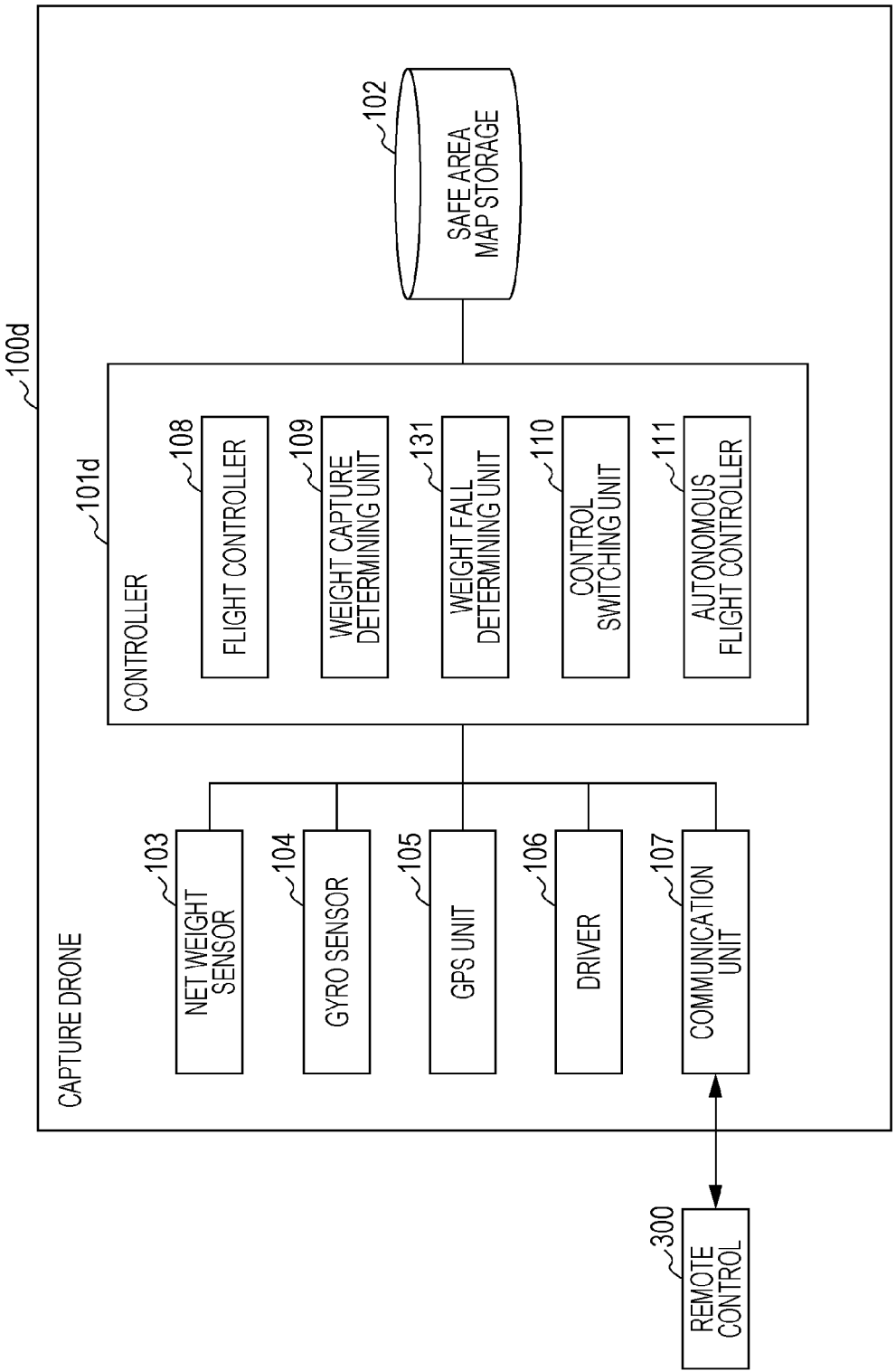
FIG. 22 is a block diagram showing an exemplary configuration of a capture drone according to a third embodiment of the present disclosure.

FIG. 22 is a block diagram showing an exemplary configuration of a capture drone 100d according to a third embodiment of the present disclosure. The capture drone 100d shown in FIG. 22 differs from the capture drone 100 shown in FIG. 1 in that the controller 101 is changed to a controller 101d, and a weight fall determining unit 131 is added to the controller 101d. The other configuration of the capture drone 100d is similar to that of the capture drone 100. The same reference sign is applied to the same part, and the detailed description thereof is omitted.

The controller 101d controls the net weight sensors 103, the gyro sensor 104, the GPS unit 105, the drivers 106, and the communication unit 107.

The weight fall determining unit 131 determines whether the suspicious drone 200 has fallen or not during movement to the destination on the basis of the weight measured by the net weight sensor 103. The weight fall determining unit 131 includes a low-pass filter that filters the weight measured by the net weight sensor 103. Also, if the weight fall determining unit 131 determines that the suspicious drone 200 has fallen, the weight fall determining unit 131 acquires current position information indicating the current position of the capture drone 100d from the GPS unit 105, as fall position information indicating a position at which the fall of the suspicious drone 200 has been detected.

Figure 23:
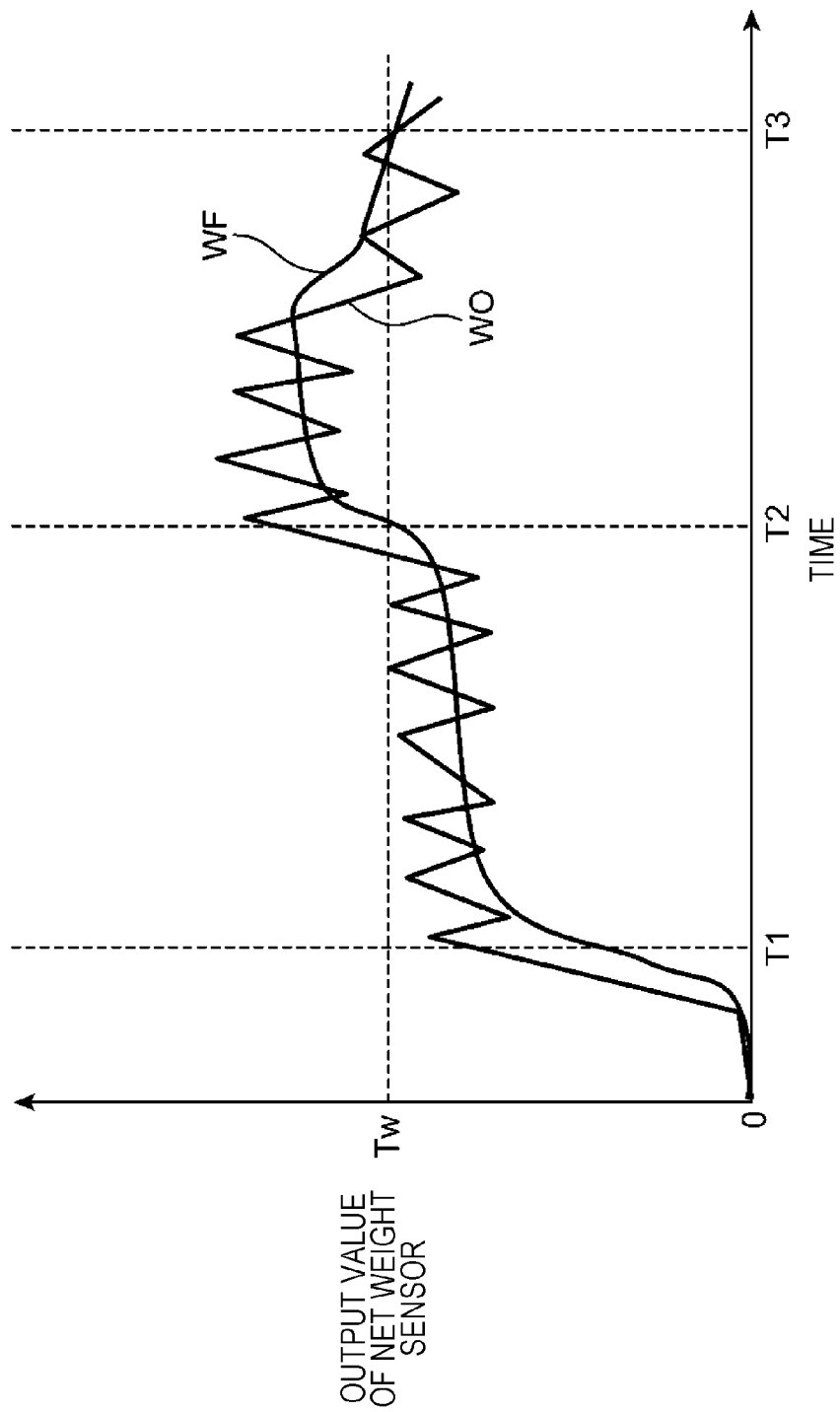
FIG. 23 is a graph for explaining an exemplary fall determination method of a weight fall determining unit with respect to the output value of the net weight sensor shown in FIG. 22.

Next, the weight fall determining unit 131 is described in detail. FIG. 23 is a graph for explaining an exemplary fall determination method of the weight fall determining unit 131 with respect to the output value of the net weight sensor shown in FIG. 22. In FIG. 23, the horizontal axis plots the time, and the vertical axis plots the output value of the net weight sensor 103.

The capture drone 100d moves to the safe area by the autonomous flight after the capture drone 100d captures the suspicious drone 200. During the movement, the suspicious drone 200 may fall. At this time, as shown in FIG. 23, if the suspicious drone 200 falls at a capture detection time T2 at which the capture drone 100d has captured or later, an output value WO of the net weight sensor 103 decreases at a fall detection time T3.

In this case, noise and the like are superimposed on the output value WO of the net weight sensor 103, and the range of fluctuation is large. In contrast, regarding an output value WF filtered by the low-pass filter of the weight fall determining unit 131, the noise and the like are removed, the output value WF smoothly changes, and the output value WF correctly represents the total weight of the capture net 112.

The weight fall determining unit 131 presets a predetermined capture detection threshold Tw with respect to the weight similarly to the weight capture determining unit 109. The weight fall determining unit 131 determines that the suspicious drone 200 has fallen by determining that the output value WF filtered by the low-pass filter is a predetermined value or larger than the capture detection threshold Tw at the capture detection time T2 or later.

In the above-described determination, the weight fall determining unit 131 detects the fall of the suspicious drone 200 if the output value WF filtered by the low-pass filter of the weight fall determining unit 131 is smaller than the capture detection threshold Tw. However, the determination is not particularly limited to this example, and various modifications can be made. For example, the weight fall determining unit 131 may determine the fall of the suspicious drone 200 by determining that a decrease amount of the weight measured by the net weight sensor 103, that is, a decrease amount of the output value filtered by the low-pass filter of the weight fall determining unit 131 (for example, a decrease amount from the average output value at the capture detection time T2 or later) is smaller than a predetermined value.

While the weight fall determining unit 131 makes determination by using the capture detection threshold Tw similarly to the weight capture determining unit 109, the determination is not particularly limited to this example, and various modifications can be made. For example, a fall detection threshold different from the capture detection threshold Tw may be used.

If the weight fall determining unit 131 determines that the suspicious drone 200 has fallen, the weight fall determining unit 131 may notify the control switching unit 110 about the determination result, the control switching unit 110 may switch the control of the flight from the autonomous flight by the autonomous flight controller 111 to the manual flight by the flight controller 108, and after the fall, the operator may manually operate the capture drone 100d.

The weight fall determining unit 131 notifies the remote control 300 through the communication unit 107 that the capture drone 100d has dropped the suspicious drone 200 during the movement to the destination and about fall position information indicating the position at which the fall of the suspicious drone 200 has been detected. When the remote control 300 receives the notification of the capture drone 100d through the communication unit 304, the controller 301 controls the display 302 to display a message indicating that the suspicious drone 200 has fallen during the movement to the destination and about the fall position information indicating the position at which the fall of the suspicious drone 200 has been detected.

Figure 24:
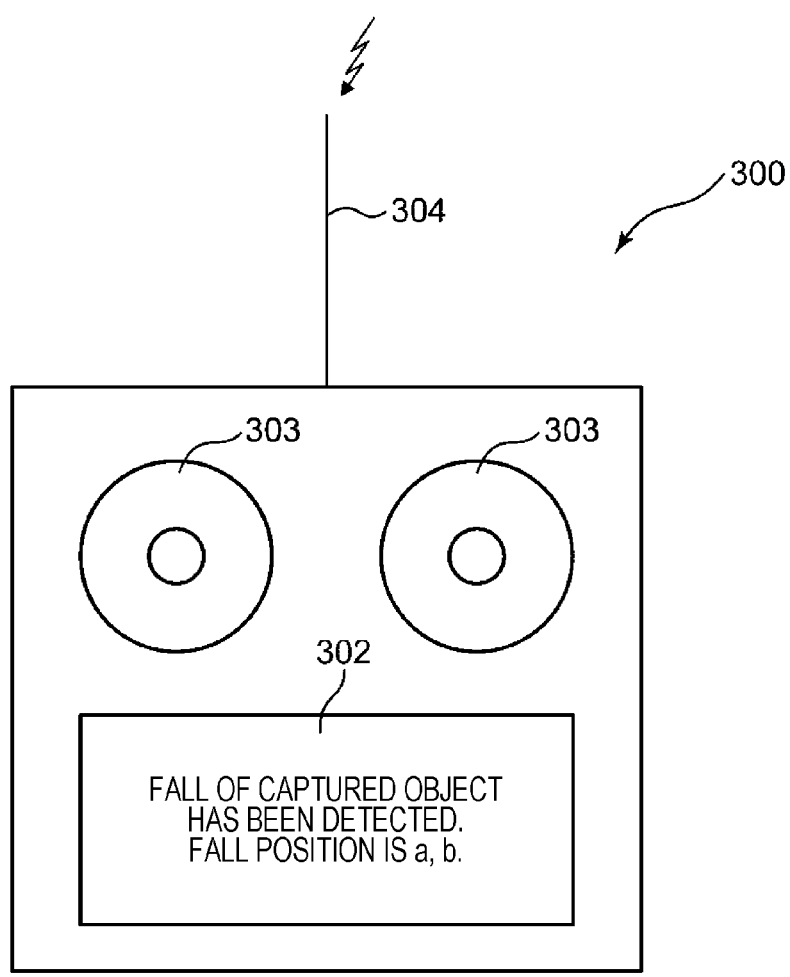
FIG. 24 is an illustration showing an exemplary display screen of the remote control for making a notification that a fall of a suspicious drone has been detected after the capture of the suspicious drone.

FIG. 24 is an illustration showing an exemplary display screen of the remote control 300 for making a notification that the fall of the suspicious drone 200 after the capture of the suspicious drone 200 has been detected. As shown in FIG. 24, a message "Fall of captured object has been detected. Fall Position is a, b." indicating that the capture drone 100d has dropped the suspicious drone 200 during the movement to the destination and the fall position information indicating the position at which the fall of the suspicious drone 200 has been detected is displayed on the display 302 of the remote control 300. By displaying such a display screen on the display 302, the operator can recognize that the suspicious drone 200 has fallen and the fall position of the suspicious drone 200.

As described above, the capture drone 100d according to this embodiment includes the communication unit 107 that receives the operation instruction for the capture drone 100d, the drivers 106 that cause the capture drone 100d to fly, the controller 101d that controls the drivers 106 on the basis of the operation instruction, the capture net 112 that captures the object in the air, the net weight sensor 103 that detects the weight of the capture net 112, the GPS unit 105 that detects the position information of the capture drone 100d, and the safe area map storage 102 that stores the safe area map for moving the suspicious drone 200. The controller 101d switches the control of the flight to the autonomous flight if the increase in weight is the predetermined value or larger, determines the destination that is the safe area being the nearest from the position information of the safe area map, moves the capture drone 100d toward the destination, and determines that the suspicious drone 200 has fallen if the decrease in weight is larger than the predetermined value. Accordingly, the capture drone 100d can start the flight to the safe area the most fast by the autonomous flight after the capture drone 100d captures the suspicious drone 200, and determine whether the suspicious drone 200 has fallen or not during the movement.

Fourth Embodiment

In this embodiment, the suspicious drone 200 is captured similarly to the capture drone 100 of the first embodiment, and further, after the suspicious drone 200 is captured, when the destination by the autonomous flight is determined, the destination is determined with regard to the weight of the suspicious drone 200 and the remaining quantity of a battery of the capture drone 100.

Figure 25:
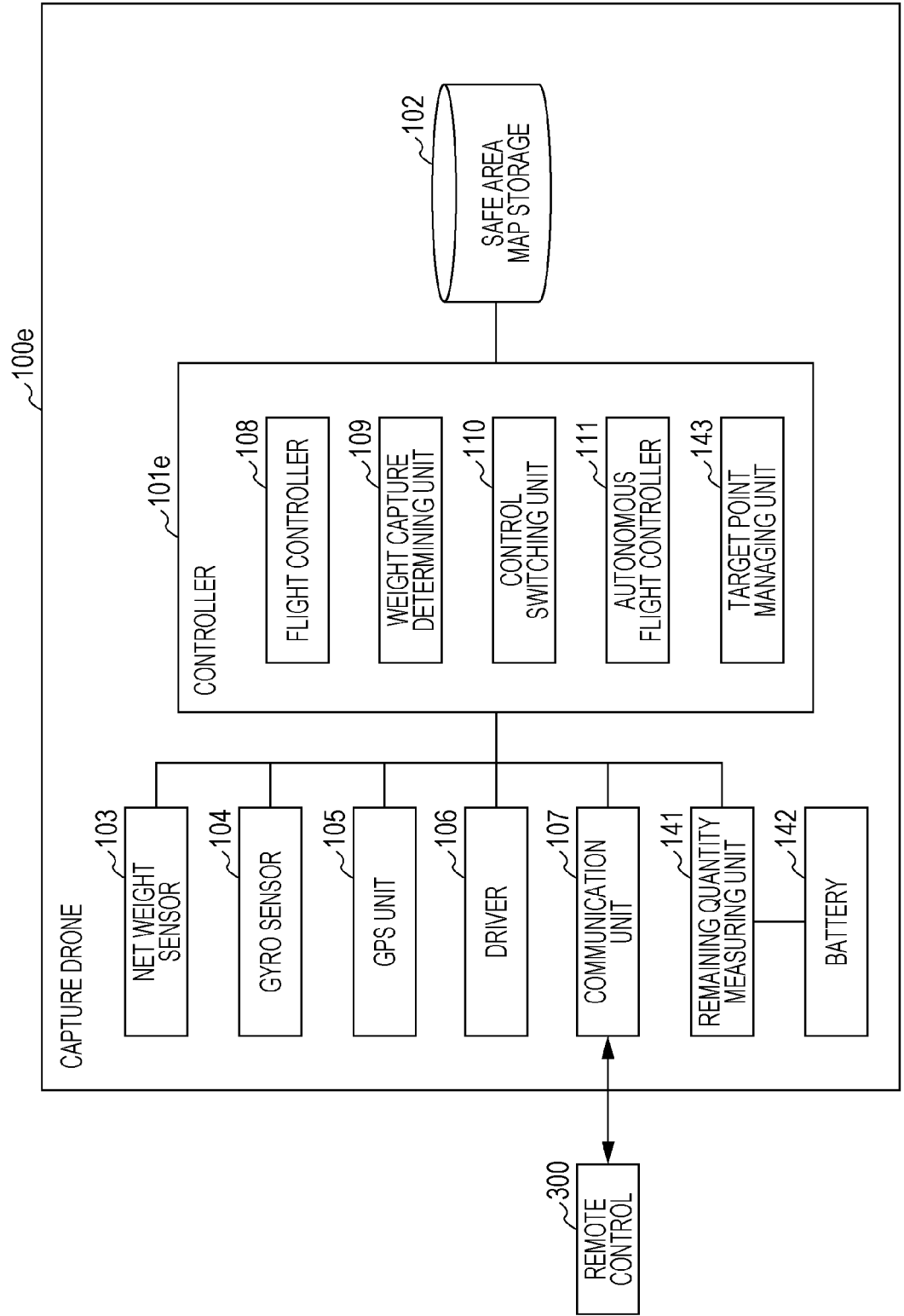
FIG. 25 is a block diagram showing an exemplary configuration of a capture drone according to a fourth embodiment of the present disclosure.

FIG. 25 is a block diagram showing an exemplary configuration of a capture drone 100e according to a fourth embodiment of the present disclosure. The capture drone 100e shown in FIG. 25 differs from the capture drone 100 shown in FIG. 1 in that a battery 142 and a remaining quantity measuring unit 141 are added, the controller 101 is changed to a controller 101e, and a target point managing unit 143 is added to the controller 101e. The other configuration of the capture drone 100e is similar to that of the capture drone 100. The same reference sign is applied to the same part, and the detailed description thereof is omitted. The battery 142 is also included in the capture drone of any of the other embodiments.

The controller 101e controls the net weight sensor 103, the gyro sensor 104, the GPS unit 105, the drivers 106, the communication unit 107, and the remaining quantity measuring unit 141.

The battery 142 supplies required power to the drivers 106 and other units of the capture drone 100e. The remaining quantity measuring unit 141 measures the remaining quantity of the battery 142, and outputs the measurement result to the target point managing unit 143.

The target point managing unit 143 determines the destination with regard to the weight of the suspicious drone 200 and the remaining quantity of the battery 142. To be specific, the target point managing unit 143, with reference to the safe area map storage 102, sets, as a final target point of the autonomous flight, the safe area with the safety level being the highest in a range nearer from a current position as the remaining quantity measured by the remaining quantity measuring unit 141 is smaller.

Figure 26:
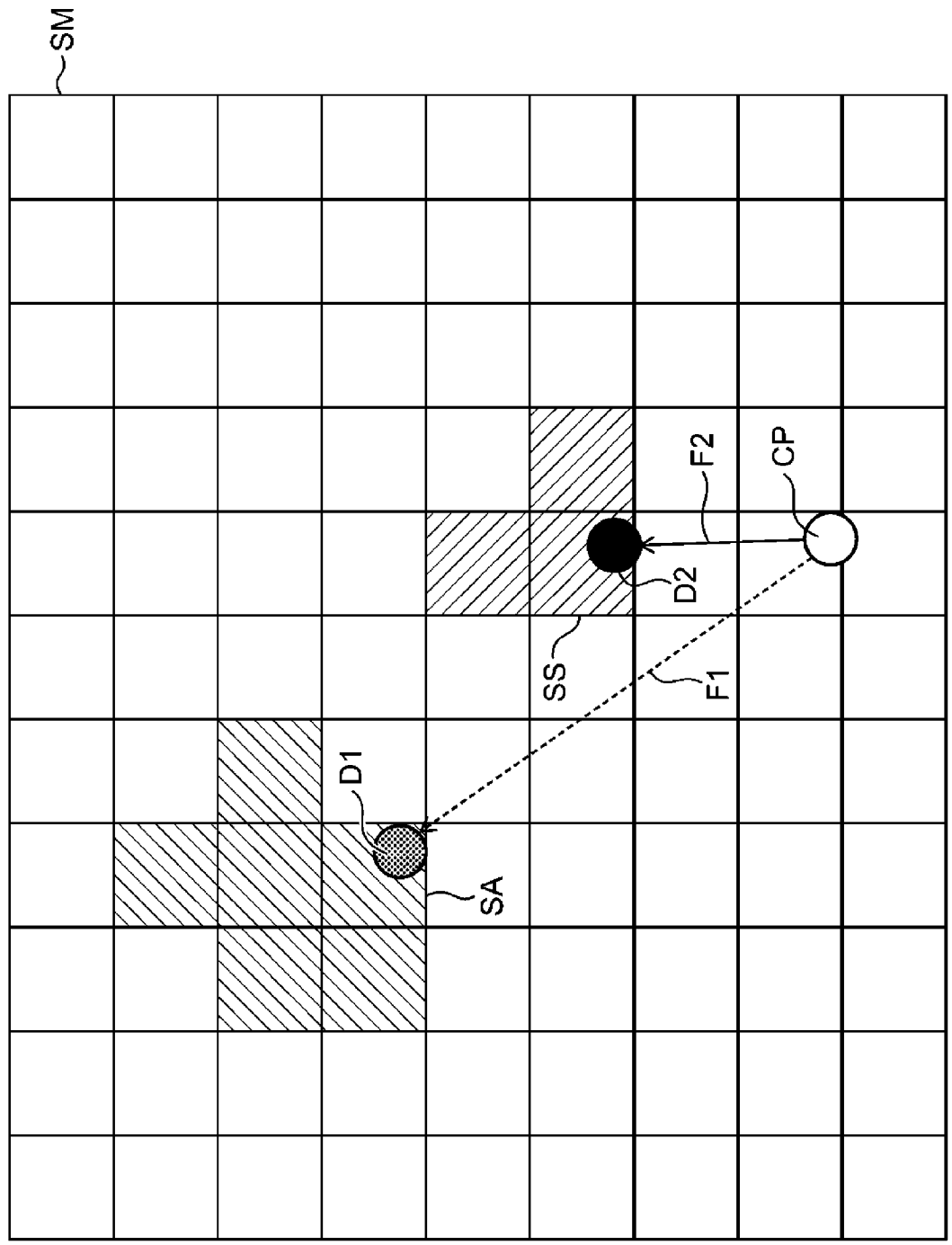
FIG. 26 is an illustration for explaining an exemplary method of determining a destination and a flight route of the suspicious drone by using the safe area map in a safe area map storage shown in FIG. 25.

FIG. 26 is an illustration for explaining an exemplary method of determining a destination and a flight route of the suspicious drone 200 by using a safe area map in the safe area map storage 102 shown in FIG. 25. As shown in FIG. 26, the safe area map storage 102 stores, for example, information on a safe area map SM in which portions with hatching of oblique lines extending from the upper right to the lower left indicate safe areas SA, such as a riverside, a seaside, a forest, a river, a lake, and a sea, and portions with hatching of oblique lines extending from the upper left to the lower right indicate quasi-safe areas SS, such as a square and a park (safe areas with lower safety levels than those of the safe areas SA).

In the example in FIG. 26, a flight route F1 connecting a current position CP of the capture drone 100e and a destination D1 in a safe area SA, and a flight route F2 connecting the current position CP of the capture drone 100e and a destination D2 in a quasi-safe area SS are indicated on a safe area map SM. In this case, the destination D2 is not a destination in the safe area SA being the nearest from the current position CP of the capture drone 100e, and is a destination in the quasi-safe area SS being the nearest from the current position CP of the capture drone 100e.

While the information with the two levels including the safe area and the quasi-safe area is used as the safety level information indicating the safety level of the safe area in the safe area map stored in the safe area map storage 102, the safety level information is not particularly limited thereto, and various modifications can be made. For example, safety level information indicating three or more safety levels may be stored.

The target point managing unit 143 calculates the maximum distance that the flight is available (the maximum distance to the final target point) on the basis of the remaining quantity of the battery 142 measured by the remaining quantity measuring unit 141, and the increase amount of the weight of the capture net 112 measured by the net weight sensor 103 (the net weight increase value indicating the increase amount of the weight of the capture net 112 as the result of the capture of the suspicious drone 200).

Figure 27:
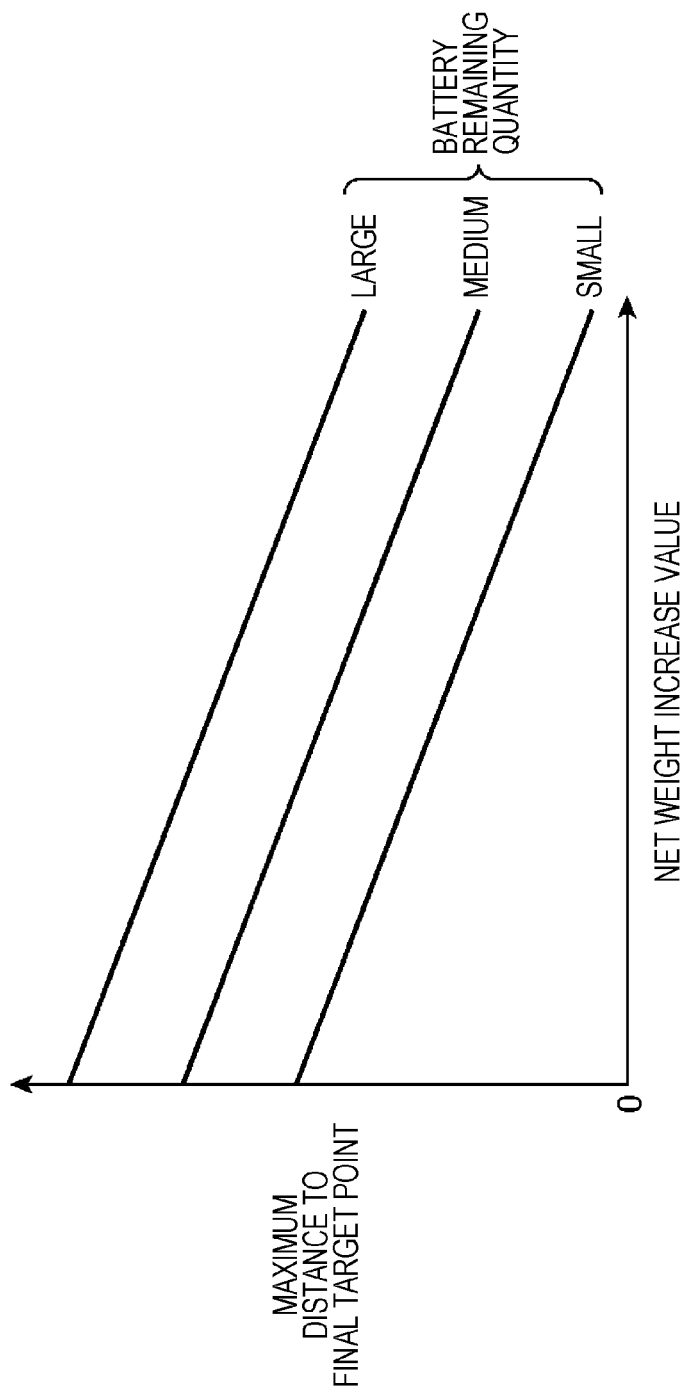
FIG. 27 is a graph showing an exemplary relationship among a maximum distance to a final target point, a net weight increase value, and a battery remaining quantity.

FIG. 27 is a graph showing an exemplary relationship among the maximum distance to the final target point, the net weight increase value, and the battery remaining quantity. An example shown in FIG. 27 shows three types of relationships between the maximum distance to the final target point and the net weight increase value. The three types include a case where the remaining quantity of the battery 142 is large, a case where the remaining quantity is medium, and a case where the remaining quantity is small. The maximum distance to the final target point decreases as the net weight increase value increases. Also, the maximum distance to the final target point decreases in the order from the case where the remaining quantity of the battery 142 is small, the case where the remaining quantity is medium, and the case where the remaining quantity is small. For example, the target point managing unit 143 determines the maximum distance to the final target point having the relationships as shown in FIG. 27.

Also, the target point managing unit 143 detects the position information indicating the current position CP of the capture drone 100e from the GPS unit 105. The target point managing unit 143 determines, as the destination D1, the safe area SA being the nearest from the position information indicating the current position CP on the safe area map SM, and generates, as the flight route F1, the route connecting the current position CP and the destination D1, in the range at the maximum distance that the flight is available.

If no safe area SA is in the range at the maximum distance that the flight is available, the target point managing unit 143 determines a quasi-safe area SS being the nearest from the position information indicating the current position CP on the safe area map SM, as a destination D2, and generates a route connecting the current position CP and the destination D2, as a flight route F2, in the range at the maximum distance that the flight is available.

As described above, the target point managing unit 143 does not determine the nearest safe area but determines the nearer quasi-safe area as the final target point in accordance with the amount of increase in weight by the capture of the suspicious drone 200. Also, the target point managing unit 143 does not determine the nearest safe area but determines the nearer quasi-safe area as the final target point if the remaining quantity of the battery 142 decreases in the midway to the final target point.

If the target point managing unit 143 cannot determine the safe area being the nearest from the current position and the quasi-safe area with reference to the safe area map storage 102, the target point managing unit 143 may notify the remote control 300 through the communication unit 107 that the safe area being the nearest from the current position and the quasi-safe area cannot be determined, the control switching unit 110 may switch the control of the flight from the autonomous flight by the autonomous flight controller 111 to the manual flight by the flight controller 108, and the operator may perform the subsequent flight by manual operation.

As described above, the capture drone 100e according to this embodiment includes the communication unit 107 that receives the operation instruction for the capture drone 100e, the drivers 106 that cause the capture drone 100e to fly, the controller 101e that controls the drivers 106 on the basis of the operation instruction, the capture net 112 that captures the object in the air, the net weight sensor 103 that detects the weight of the capture net 112, the GPS unit 105 that detects the position information of the capture drone 100e, and the safe area map storage 102 that stores the safe area map in which the safe area position information indicating the position of the safe area is associated with the safety level information indicating the safety level of the safe area. The controller 101e, with reference to the safe area map storage 102, sets, as the final target point, the safe area with the highest safety level in the range nearer from the current position as the increase value of the weight of the capture net 112 measured by the net weight sensor 103 increases. Accordingly, the capture drone 100e can reliably move to the safe area by the autonomous flight in accordance with the weight of the suspicious drone 200.

Also, the capture drone 100e according to this embodiment further includes the battery 142 that supplies power to the capture drone 100e, and the remaining quantity measuring unit 141 that measures the remaining quantity of the battery 142. The controller 101e sets, as the final target point of the autonomous flight, the safe area with the highest safety level in the range nearer from the current position as the remaining quantity measured by the remaining quantity measuring unit 141 is smaller. Accordingly, the capture drone 100e can reliably move to the safe area by the autonomous flight in accordance with the remaining quantity of the battery 142.

An unmanned flying object, a control method, and a control program according to this disclosure are useful as an unmanned flying object that flies in the air and captures other object in the air, such as a suspicious unmanned flying object, as well as a control method, and a control program because the unmanned flying object can properly fly even when the unmanned flying object captures other object in the air, such as the suspicious unmanned flying object.

What is claimed is:

1. An unmanned flying object that flies in air, comprising:
   a capturer, including at least one of a net, a sucking device, a stick, a rope or a spear, that captures an object other than the unmanned flying object in the air;
   a sensor that detects that the capturer has captured the object; and
   a processor performs operations including:
   receiving a manual operation signal via wireless communication, the manual operation signal being transmitted from a remote controller in response to an operation on the remote controller by a human operator;
   performing a manual flight control that controls the unmanned flying object on the basis of the manual operation signal from the remote controller; and
   switching from the manual flight control to an autonomous flight control that controls the unmanned flying object to not be dependent on the manual operation signal via wireless communication, when the sensor detects the capture of the object while the manual flight control is being performed.

2. The unmanned flying object according to claim 1, wherein
   the sensor comprises a weight sensor that measures a weight of the capturer, and
   the capture of the object is detected by determining that the weight measured by the weight sensor is a predetermined value or larger.

3. The unmanned flying object according to claim 1, further comprising:
   an electric motor that causes the unmanned flying object to fly,
   wherein the sensor comprises a current sensor that measures a driving current of the electric motor, and
   the capture of the object is detected by determining that the driving current measured by the current sensor is a predetermined value or larger.

4. The unmanned flying object according to claim 1, further comprising:
   a motor that causes the unmanned flying object to fly,
   wherein the sensor comprises a rotation speed sensor that measures a rotation speed of the motor, and
   the capture of the object is detected by determining that the rotation speed measured by the rotation speed sensor is a predetermined value or larger.

5. The unmanned flying object according to claim 2, further comprising:
   a anemometer that measures a wind speed relative to the unmanned flying object,
   wherein the predetermined value is changed in accordance with the wind speed measured by the anemometer.

6. The unmanned flying object according to claim 1, further comprising:
   a memory that stores safe area position information indicating a position of a safe area in which the object can be safely landed,
   wherein the processor performs the autonomous flight control to cause the unmanned flying object to fly from a position at which the sensor has detected the capture of the object to the safe area indicated by the safe area position information stored in the memory.

7. The unmanned flying object according to claim 6, wherein the processor transmits, via wireless communication, the safe area position information indicating the position of the safe area to which the unmanned flying object is directed by the autonomous flight control.

8. The unmanned flying object according to claim 1, wherein the processor transmits, via wireless communication, information indicating that the sensor has detected the capture of the object.

9. The unmanned flying object according to claim 2, wherein the sensor detects dropping of the object by the unmanned flying object, by determining that the weight measured by the weight sensor is smaller than a predetermined value after the capture of the object is detected.

10. The unmanned flying object according to claim 9, wherein the processor transmits, via wireless communication, information indicating that the sensor has detected the dropping of the object by the unmanned flying object.

11. The unmanned flying object according to claim 9, wherein the processor transmits, via wireless communication, dropping position information indicating a position at which the sensor has detected the dropping of the object by the unmanned flying object.

12. The unmanned flying object according to claim 2, further comprising:
    a memory that stores map information, in which safe area position information indicating a position of a safe area in which the object can be safely landed, is associated with safety level information indicating a safety level of the safe area,
    wherein the processor determines a distance range from a current position of the unmanned flying object, such that the distance range decreases as the weight measured by the weight sensor increases, and, with reference to the map information stored in the memory, sets, as a final target point of the autonomous flight control, the safe area having the highest safety level in the distance range.

13. The unmanned flying object according to claim 1, further comprising:
    a battery that supplies power to the unmanned flying object; and
    a memory that stores map information, in which safe area position information indicating a position of a safe area in which the object can be safely landed, is associated with safety level information indicating a safety level of the safe area, wherein the processor determines a distance range from a current position of the unmanned flying object, such that the distance range decreases as a remaining quantity of the battery decreases, and, with reference to the map information stored in the memory, sets, as a final target point of the autonomous flight control, the safe area having the highest safety level in the distance range.

14. A method of controlling an unmanned flying object that flies in air, comprising:

detecting that the unmanned flying object has captured an object other than the unmanned flying object in the air; and receiving a manual operation signal via wireless communication, the manual operation signal being transmitted from a remote controller in response to an operation on the remote controller by a human operator;

performing a manual flight control that controls the unmanned flying object on the basis of the manual operation signal from the remote controller;

switching from the manual flight control to an autonomous flight control that controls the unmanned flying object to not be dependent on the manual operation signal via wireless communication, upon detecting the capture of the object while the manual flight control is being performed.

15. A non-transitory computer-readable recording medium storing a program that causes a computer to function as a controller of an unmanned flying object that flies in air, wherein, when the program is executed by the computer, the program causes the computer to execute operations comprising:

detecting that the unmanned flying object has captured an object other than the unmanned flying object in the air; and receiving a manual operation signal via wireless communication, the manual operation signal being transmitted from a remote controller in response to an operation on the remote controller by a human operator;

performing a manual flight control that controls the unmanned flying object on the basis of the manual operation signal from the remote controller;

switching from the manual flight control to an autonomous flight control that controls the unmanned flying object to not be dependent on the manual operation signal via wireless communication, upon detecting the capture of the object while the manual flight control is being performed.

16. The unmanned flying object according to claim 9, wherein, when the sensor detects the dropping of the object by the unmanned flying object during the autonomous flight control after the capture of the object is detected, the processor switches from the autonomous flight control to the manual flight control such that the unmanned flying object is manually controlled by the human operator.

17. The unmanned flying object according to claim 1, wherein, when the sensor detects the capture of the object while the manual flight control is being performed, the processor stops receiving the manual operation signal via wireless communication from the remote controller.

* * * * *